(12) United States Patent
Wang et al.

(10) Patent No.: US 11,553,541 B2
(45) Date of Patent: Jan. 10, 2023

(54) WI-FI CONNECTION METHOD AND DEVICE

(71) Applicant: Huawei Technologies Co., Ltd., Shenzhen (CN)

(72) Inventors: Zhong Wang, Shenzhen (CN); Huajiang Gao, Beijing (CN); Wei Gao, Beijing (CN); Bangbang Huang, Beijing (CN); Tie Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 16/336,836

(22) PCT Filed: Jun. 30, 2017

(86) PCT No.: PCT/CN2017/091291
§ 371 (c)(1),
(2) Date: Mar. 26, 2019

(87) PCT Pub. No.: WO2018/059045
PCT Pub. Date: Apr. 5, 2018

(65) Prior Publication Data
US 2020/0288517 A1 Sep. 10, 2020

(30) Foreign Application Priority Data

Sep. 27, 2016 (CN) .......................... 201610856216.7
Mar. 31, 2017 (CN) .......................... 201710209569.2

(51) Int. Cl.
*H04W 76/14* (2018.01)
*H04W 48/16* (2009.01)
(Continued)

(52) U.S. Cl.
CPC ......... *H04W 76/14* (2018.02); *H04W 12/068* (2021.01); *H04W 48/16* (2013.01); *H04W 88/04* (2013.01); *H04W 92/18* (2013.01)

(58) Field of Classification Search
CPC ... H04W 76/14; H04W 12/068; H04W 48/16; H04W 88/04; H04W 92/18
See application file for complete search history.

(56) References Cited

U.S. PATENT DOCUMENTS

| 6,269,395 B1 * | 7/2001 | Blatherwick | ........... G06F 16/25 709/219 |
| 2007/0180499 A1 * | 8/2007 | Van Bemmel | ...... H04L 63/0869 726/4 |

(Continued)

FOREIGN PATENT DOCUMENTS

| CN | 104144515 A | 11/2014 |
| CN | 104349401 A | 2/2015 |

(Continued)

*Primary Examiner* — Michael Thier
*Assistant Examiner* — Nevena Zecevic Sandhu
(74) *Attorney, Agent, or Firm* — Slater Matsil, LLP

(57) ABSTRACT

A Wi-Fi connection method and a device is provided. The method includes: searching an ambient environment of a device for a Wi-Fi access point, to obtain a list of Wi-Fi access points; determining a target access point in the list of Wi-Fi access points; sending a connection request to a device in which the target access point resides; receiving feedback information that is returned, according to the connection request, by the device in which the target access point resides, where the feedback information indicates whether the target access point is a portable Wi-Fi hotspot; and if the feedback information indicates that the target access point is a portable Wi-Fi hotspot, outputting prompt information, where the prompt information is used to remind a user of the device that the target access point is a portable Wi-Fi hotspot.

15 Claims, 20 Drawing Sheets

(51) Int. Cl.
*H04W 88/04* (2009.01)
*H04W 12/06* (2021.01)
*H04W 92/18* (2009.01)

(56) References Cited

U.S. PATENT DOCUMENTS

| | | |
|---|---|---|
| 2013/0210379 A1 | 8/2013 | Cloutier |
| 2014/0086179 A1* | 3/2014 | Shi .................. H04L 5/0037 370/329 |
| 2015/0063230 A1 | 3/2015 | Feng |
| 2016/0007265 A1 | 1/2016 | Xiu |
| 2016/0007387 A1 | 1/2016 | Adib et al. |
| 2016/0366638 A1* | 12/2016 | Kumar .............. H04W 52/0206 |
| 2017/0374552 A1 | 12/2017 | Xia et al. |
| 2018/0124693 A1* | 5/2018 | Ringland .............. H04W 48/18 |

FOREIGN PATENT DOCUMENTS

| | | | |
|---|---|---|---|
| CN | 104853405 | A | 8/2015 |
| CN | 105307235 | A | 2/2016 |
| CN | 105323782 | * | 2/2016 |
| CN | 105323782 | A | 2/2016 |
| CN | 105430713 | * | 3/2016 |
| CN | 105430713 | A | 3/2016 |
| CN | 103096384 | B | 4/2016 |
| CN | 105848193 | A | 8/2016 |
| CN | 103117906 | B | 12/2016 |
| EP | 3007477 | A1 | 4/2016 |

* cited by examiner

WI-FI CONNECTION METHOD AND DEVICE

CROSS-REFERENCE TO RELATED APPLICATIONS

This application is a National Stage of International Application No. PCT/CN2017/091291, filed Jun. 30, 2017, which claims priority to Chinese Patent Application No. 201610856216.7, filed on Sep. 27, 2016 and Chinese Patent Application No. 201710209569.2, filed on Mar. 31, 2017. All of the aforementioned applications are hereby incorporated by reference in their entireties.

TECHNICAL FIELD

This application relates to the wireless communications field, and in particular, to a Wi-Fi connection method and a device.

BACKGROUND

With development of wireless communications, a terminal has more and more network connection manners. For example, a device may set an IEEE 802.11b standard-based wireless local area network Wi-Fi hotspot, and another device connects to the Wi-Fi hotspot, to set up a Wi-Fi connection. In this way, the two devices both connect to a network.

However, when the two devices set up the Wi-Fi connection, a device requesting the Wi-Fi connection can be successfully connected provided that a password is correct, but cannot identify whether a Wi-Fi access point to which the device connects is a portable Wi-Fi hotspot shared by a fee-based apparatus such as a mobile phone. In this case, a great traffic loss may be caused to a device providing the Wi-Fi connection, thereby further causing a loss to a user.

SUMMARY

In view of the above, this application provides a Wi-Fi connection method and a device, to resolve a prior-art technical problem that a device connecting to a Wi-Fi access point cannot identify whether the Wi-Fi access point to which the device connects is a portable Wi-Fi hotspot.

A first aspect of this application provides a Wi-Fi connection method. After a Wi-Fi access point of a first device is enabled, a connection request of a second device is received, and then feedback information that can indicate whether the Wi-Fi access point is a portable Wi-Fi hotspot is sent to the second device according to the connection request. It can be learned that in this application, a device providing a Wi-Fi access point feeds back, to a device applying for a Wi-Fi connection, information that can indicate whether the Wi-Fi access point is a portable Wi-Fi hotspot. Therefore, the device applying for the Wi-Fi connection is reminded in time that the Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A second aspect of this application provides a Wi-Fi connection method. An ambient environment of a second device is searched for a Wi-Fi access point, to obtain a list of Wi-Fi access points to which the second device can choose to connect. The list of Wi-Fi access points includes at least one Wi-Fi access point. After a target access point in the list of Wi-Fi access points is determined, a connection request is sent to a device in which the target access point resides. Then, feedback information that is returned, according to the connection request, by the device in which the target access point resides is received. The feedback information can indicate whether the target access point is a portable Wi-Fi hotspot. If the feedback information indicates that the target access point is a portable Wi-Fi hotspot, second prompt information that can remind a user of the second device that the target access point is a portable Wi-Fi hotspot is output. It can be learned that in this application, that connected Wi-Fi hotspot is a portable Wi-Fi hotspot can be identified in time by receiving feedback information sent by a device providing the Wi-Fi access point. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A third aspect of this application provides a device. The device may include the following modules: a Wi-Fi module that enables a Wi-Fi access point of the device, and a data processing module. The data processing module is configured to: receive a connection request of a second device, and send feedback information to the second device according to the connection request, where the feedback information indicates whether the Wi-Fi access point is a portable Wi-Fi hotspot. It can be learned that in this application, a Wi-Fi connection apparatus disposed on a device providing a Wi-Fi access point feeds back, to a device applying for a Wi-Fi connection, information that can indicate whether the Wi-Fi access point is a portable Wi-Fi hotspot. Therefore, the device applying for the Wi-Fi connection is reminded in time that the Wi-Fi access point to which the device is to connect is a portable Wi-Fi hotspot. A device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A fourth aspect of this application provides a device. The device may include the following modules: a Wi-Fi module, a data processing module, and a data output module. The Wi-Fi module is configured to search an ambient environment of the second device for a Wi-Fi access point, to obtain a list of Wi-Fi access points to which the second device can choose to connect. The list of Wi-Fi access points includes at least one Wi-Fi access point. The data processing module is configured to: determine a target access point in the list of Wi-Fi access points; send a connection request to a device in which the target access point resides; and receive feedback information that is returned, according to the connection request, by the device in which the target access point resides. The feedback information indicates whether the target access point is a portable Wi-Fi hotspot. The data output module is configured to: if the feedback information indicates that the target access point is a portable Wi-Fi hotspot, output second prompt information, where the second prompt information is used to remind a user of the second device that the target access point is a portable Wi-Fi hotspot. It can be learned that in this application, that connected Wi-Fi is a portable Wi-Fi hotspot can be identified in time by using a Wi-Fi connection apparatus disposed on the second device to receive feedback information sent by a device providing the Wi-Fi access point. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A fifth aspect of this application provides a device. The device may include the following structures: a Wi-Fi chip, configured to provide a Wi-Fi connection; a memory, configured to store a software program and a software module; a processor; and a bus. The Wi-Fi chip and the memory are separately connected to the processor by using the bus. The processor is configured to run the software program and the software module stored in the memory, so that the device implements the following functions and processes data: enabling, by using the Wi-Fi chip, a Wi-Fi access point; receiving a connection request of a second device; and sending feedback information to the second device according to the connection request, where the feedback information indicates whether the Wi-Fi access point is a portable Wi-Fi hotspot. It can be learned that in this application, a device providing a Wi-Fi access point feeds back, to a device applying for a Wi-Fi connection, information that can indicate whether the Wi-Fi access point is a portable Wi-Fi hotspot. Therefore, the device applying for the Wi-Fi connection is reminded in time that the Wi-Fi access point to which the device is to connect is a portable Wi-Fi hotspot. A device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A sixth aspect of this application provides a device. The device may include the following structures: a Wi-Fi chip, configured to provide a Wi-Fi connection; an output device, configured to output data; a memory, configured to store a software program and a software module; a processor; and a bus. The Wi-Fi chip, the output device, and the memory are separately connected to the processor by using the bus. The processor is configured to run the software program and the software module stored in the memory, so that the device implements the following functions and processes data: searching, by using the Wi-Fi chip, an ambient environment of the device for a Wi-Fi access point, to obtain a list of Wi-Fi access points to which the device can choose to connect, where the list of Wi-Fi access points includes at least one Wi-Fi access point; determining a target access point in the list of Wi-Fi access points; sending a connection request to a device in which the target access point resides; and receiving feedback information that is returned, according to the connection request, by the device in which the target access point resides, where the feedback information indicates whether the target access point is a portable Wi-Fi hotspot; and if the feedback information indicates that the target access point is a portable Wi-Fi hotspot, triggering the output device to output second prompt information, where the second prompt information is used to remind a user of the device that the target access point is a portable Wi-Fi hotspot. It can be learned that in this application, that connected Wi-Fi is a portable Wi-Fi hotspot can be identified in time by receiving feedback information sent by a device providing the Wi-Fi access point. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In an implementation, the first device outputs first prompt information according to the connection request. Therefore, when a Wi-Fi access point provided by the first device is a portable Wi-Fi hotspot, a user of the first device can be reminded in time to connect to another device. In this way, the following case is avoided: The user of the first device cannot learn of a connection status of the portable Wi-Fi hotspot in time, and therefore, a loss is caused due to unknowing consumption of a large amount of traffic data.

In an implementation, the first device determines whether login information in the connection request is consistent with a login parameter preset for the Wi-Fi access point, and if the login information is consistent with the login parameter, the first device allows the second device to connect to the Wi-Fi access point. In this way, the first device controls, according to the connection request, a connection of the second device to the Wi-Fi access point, to implement a Wi-Fi connection of the second device.

In an implementation, the first device may output information about a quantity of devices connected to the Wi-Fi access point. In this way, in this application, a quantity of devices currently connected to the Wi-Fi access point is notified to the user in real time, to provide reference data for the user of the first device. The user determines whether to disconnect from some devices, thereby protecting benefits of the user of the first device.

In an implementation, after outputting the second prompt information, the second device may set up a Wi-Fi connection to the target access point. In this application, that connected Wi-Fi is a portable Wi-Fi hotspot is identified in time by receiving feedback information sent by a device providing the Wi-Fi access point. Therefore, a device connecting to the Wi-Fi access point can learn in time that the Wi-Fi access point to which the device connects is a portable Wi-Fi hotspot, and then set up a Wi-Fi connection. In this way, a great traffic loss is avoided as soon as possible for the device providing the Wi-Fi hotspot.

In an implementation, if the feedback information indicates that the target access point is a portable Wi-Fi hotspot, the second device determines whether a default connection mode is used; and if the default connection mode is used, the second device outputs the second prompt information, and sets up a Wi-Fi connection to the target access point. It can be learned that in this application, when that connected Wi-Fi is a portable Wi-Fi hotspot is identified in time by receiving feedback information sent by a device providing the Wi-Fi access point, the second device determines whether a user presets a device to directly connect to a portable Wi-Fi hotspot, and when determining that the user presets the device to directly connect to a portable Wi-Fi hotspot, the second device displays the second prompt information and sets up a Wi-Fi connection. In this way, a great traffic loss is avoided as soon as possible for the device providing the Wi-Fi hotspot.

In an implementation, if the default connection mode is not used, the second device receives an input operation of the user, and determines whether the input operation indicates that a user of the second device needs to connect to the target access point; and if the input operation indicates that the user of the second device needs to connect to the target access point, the second device outputs the second prompt information, and sets up a Wi-Fi connection to the target access point. It can be learned that in this application, when that connected Wi-Fi is a portable Wi-Fi hotspot is identified in time by receiving feedback information sent by a device providing the Wi-Fi access point, the second device determines whether a user presets a device to directly connect to a portable Wi-Fi hotspot, and when determining that the user does not preset the device to directly connect to a portable Wi-Fi hotspot, the second device receives the input operation of the user to allow the user to determine to connect to the portable Wi-Fi hotspot, in other words, the second device displays the second prompt information and sets up a Wi-Fi connection. In this way, a great traffic loss is avoided as soon as possible for the device providing the Wi-Fi hotspot.

In an implementation, that the second device sets up the Wi-Fi connection to the target access point may be implemented in the following manner: determining whether login information is consistent with a login parameter of the target access point; and if the login information is consistent with the login parameter of the target access point, connecting to the target access point. It can be learned that in this application, when that connected Wi-Fi is a portable Wi-Fi hotspot is identified in time by receiving feedback information sent by a device providing the Wi-Fi access point, the second device sets up the Wi-Fi connection to the target access point. In this way, when the Wi-Fi connection is set up, a great traffic loss is avoided as soon as possible for the device providing the Wi-Fi hotspot.

In an implementation, after setting up the Wi-Fi connection to the target access point, the second device monitors whether a Wi-Fi access point whose login parameter is consistent with login information in the connection request is found; if the Wi-Fi access point is found, outputs third prompt information, and collects an input operation; and when the input operation indicates that switching to the found Wi-Fi access point is required, disconnects from the target access point, and sets up a Wi-Fi connection to the found Wi-Fi access point. It can be learned that in this application, when finding a new connectable Wi-Fi access point, the second device can remind the user of the second device whether to switch to the new Wi-Fi access point for use, and when the user operation allows the second device to switch to the new Wi-Fi access point, the second device connects to the new Wi-Fi access point. In this way, a great traffic loss is further avoided for the device providing the portable Wi-Fi hotspot.

In an implementation, when sending feedback information to the second device, the first device may transmit an AT command to the first device, to remind in time a device applying for a Wi-Fi connection that a Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In an implementation, when sending feedback information to the second device, the first device may transmit the feedback information to the second device through an interface, to remind in time a device applying for a Wi-Fi connection that a Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In an implementation, the first device outputs the first prompt information by displaying the first prompt information on a screen. It can be learned that in this application, the first prompt information is displayed to remind in time a device applying for a Wi-Fi connection that a Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In an implementation, when outputting the first prompt information by displaying the first prompt information on a screen, the first device may specifically display the first prompt information by using a toast, a notification bar, a status bar, or the like. Therefore, a device connecting to the Wi-Fi access point can learn in time, according to the displayed first prompt information, that the Wi-Fi access point to which the device connects is a portable Wi-Fi hotspot. In this way, a great traffic loss is avoided as soon as possible for the device providing the Wi-Fi hotspot.

In an implementation, the first device outputs the first prompt information by playing a sound. It can be learned that in this application, the first prompt information is played to remind in time a device applying for a Wi-Fi connection that a Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In an implementation, the first device may play the first prompt information by using an audio output device. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A seventh aspect of this application provides a computer readable storage medium. The computer readable storage medium stores an instruction. When the instruction is run on a computer, the computer performs the methods in the foregoing aspects.

An eighth aspect of this application provides a computer program product that includes an instruction. When the computer program product is run on a computer, the computer performs the methods in the foregoing aspects.

A ninth aspect of this application provides a Wi-Fi connection method. The method may include the following steps: A terminal searches for ambient Wi-Fi; selects a Wi-Fi access point from a found Wi-Fi list, and determines whether the Wi-Fi access point is a portable Wi-Fi hotspot; if the Wi-Fi access point is a portable Wi-Fi hotspot, determines whether a default connection is set for the terminal; if the default connection is set, reminds a user that the Wi-Fi is a portable Wi-Fi hotspot; and connects to the portable Wi-Fi hotspot. It can be learned that in this application, that connected Wi-Fi is a portable Wi-Fi hotspot can be identified in time by receiving feedback information sent by a device providing the Wi-Fi access point, a user is reminded in time, and the Wi-Fi hotspot is connected. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

A tenth aspect of this application provides a terminal. The terminal may include the following structures: a memory storing an instruction, and a processor. The processor invokes the instruction stored in the memory, to perform the foregoing Wi-Fi connection method, for example: searching for ambient Wi-Fi; selecting a Wi-Fi access point from a found Wi-Fi list, and determining whether the Wi-Fi access point is a portable Wi-Fi hotspot; if the Wi-Fi access point is a portable Wi-Fi hotspot, determining whether a default connection is set for the terminal; if the default connection is set, reminding a user that the Wi-Fi is a portable Wi-Fi hotspot; and connecting to the portable Wi-Fi hotspot. It can be learned that in this application, that connected Wi-Fi is a portable Wi-Fi hotspot can be identified in time by receiving feedback information sent by a device providing the Wi-Fi access point, a user is reminded in time, and the Wi-Fi hotspot is connected. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

BRIEF DESCRIPTION OF THE DRAWINGS

To describe the technical solutions in embodiments of this application or in the prior art more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

FIG. 4a-i and FIG. 4a-2, FIG. 4b, FIG. 4c-i and FIG. 4c-2, and FIG. 4d are respectively method flowcharts for setting up a Wi-Fi connection by a second device according to an embodiment of this application;

DETAILED DESCRIPTION OF ILLUSTRATIVE EMBODIMENTS

Figure 1:
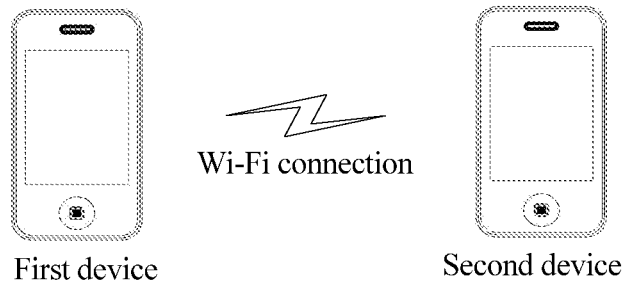
FIG. 1 is a schematic communications connection diagram of setting up a Wi-Fi hotspot connection between two devices in this application.

FIG. 1 is a schematic communications connection diagram of setting up a Wi-Fi hotspot connection between two devices. The device may include a mobile phone, a tablet computer, a PDA (Personal Digital Assistant, personal digital assistant), a POS (Point of Sale, point of sale), an in-vehicle computer, or the like. A first device in FIG. 1 provides a Wi-Fi access point by setting a parameter of a Wi-Fi chip. The Wi-Fi access point may be a Wi-Fi access point provided by a router, or may be a portable Wi-Fi hotspot provided by a mobile device. A second device connects to the Wi-Fi access point by using a password. In addition, after a Wi-Fi hotspot connection is set up between the first device and the second device, the second device records a name and a password of the Wi-Fi hotspot of the first device. In this way, the second device may directly connect to the Wi-Fi hotspot next time by using the recorded name and password of the Wi-Fi hotspot.

When finding one or more Wi-Fi access points by using a Wi-Fi search function, the second device does not distinguish between types of the found Wi-Fi access points. For example, the second device does not distinguish whether the Wi-Fi access point is a portable Wi-Fi hotspot provided by an apparatus such as a mobile phone. When the second device approaches the first device again to which the second device successfully sets up a Wi-Fi connection before, and the second device is located in a connection range of the Wi-Fi hotspot of the first device, the second device automatically connects to the Wi-Fi hotspot of the first device by using the recorded password. In this case, a user of the first device is not notified that the second device connects to the portable Wi-Fi hotspot of the first device, and a user of the second device is not notified that a hotspot to which the second device connects is the portable Wi-Fi hotspot.

In addition, the first device usually provides a Wi-Fi hotspot service based on mobile data traffic of a communications operator. Therefore, for a user, especially a user of a device providing a portable Wi-Fi hotspot, two devices between which a Wi-Fi hotspot connection is set up before may consume a large amount of traffic data without the user's consent. Because most mobile traffic services provided by the communication operator are charged based on traffic, the consumption of the large amount of traffic may cause a high traffic fee to the user, thereby severely affecting the user's benefits.

Therefore, to avoid the foregoing risk, connection to a portable Wi-Fi hotspot needs to be constrained.

To resolve the foregoing problem, this application provides the following solutions.

Figure 2A:
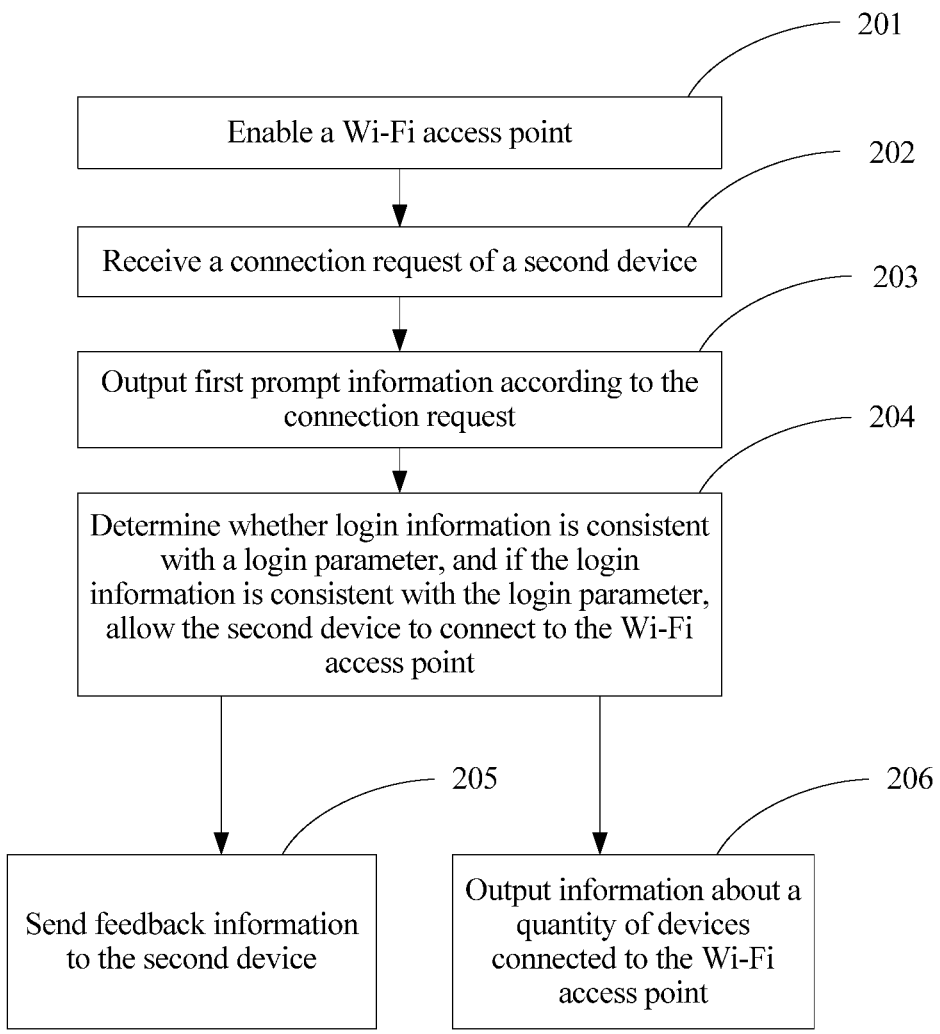
FIG. 2a is a method flowchart for setting up a Wi-Fi connection by a first device according to an embodiment of this application.

FIG. 2a is a flowchart in which the first device in FIG. 1 enables a Wi-Fi access point and controls a Wi-Fi connection. FIG. 2a may include the following steps.

Step 201: Enable a Wi-Fi access point.

The first device may be a mobile terminal such as a mobile phone, and the Wi-Fi access point enabled by the first device is a portable Wi-Fi hotspot. Alternatively, the first device may be a communications device such as a router, and the Wi-Fi access point enabled by the first device is a non-portable Wi-Fi hotspot.

Figure 2B:
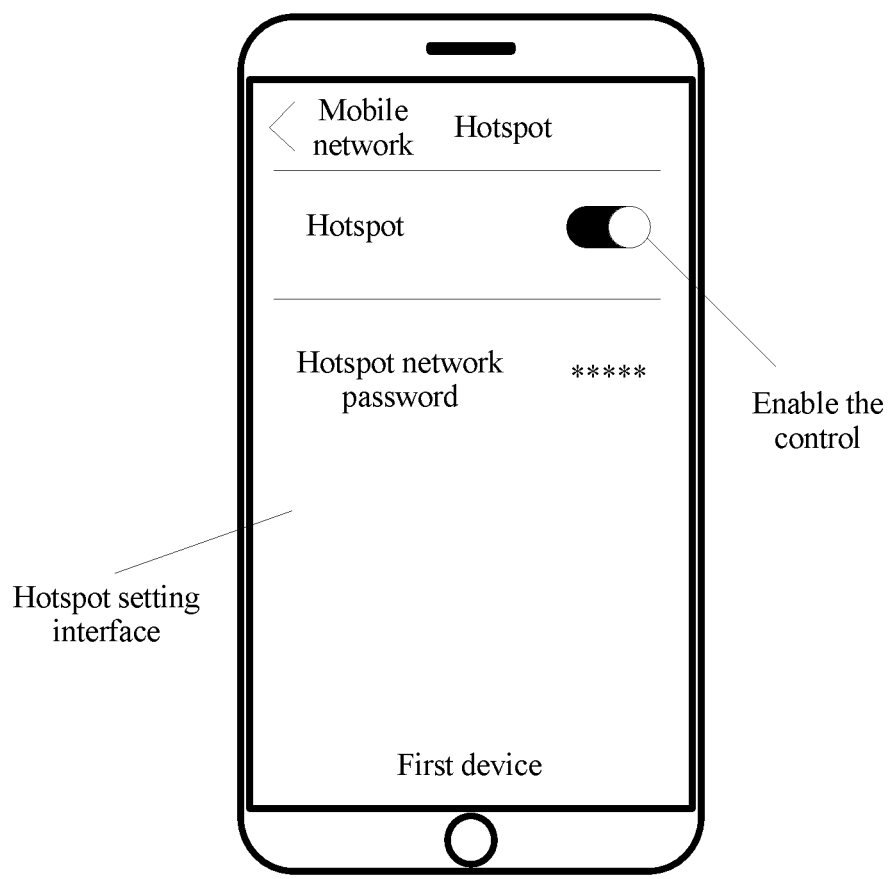
FIG. 2b to FIG. 2e are diagrams of application examples according to an embodiment of this application.

In this application, a Wi-Fi access point function may be enabled by setting a parameter of a Wi-Fi chip in the first device. As shown in FIG. 2b, a user performs an operation on an enabling control of the Wi-Fi chip in a Wi-Fi chip setting interface of the first device such as a mobile phone. In this embodiment, after receiving the operation performed on the control by the user, a Wi-Fi hotspot of the first device is enabled. The Wi-Fi hotspot is used to provide a network connection for another device.

It should be noted that the Wi-Fi chip in the first device may be an independent Wi-Fi chip, or may be a joint chip integrating a Wi-Fi communication function with other functions. The joint chip can provide the Wi-Fi communication function. For example, the joint chip may integrate a Wi-Fi chip, Bluetooth, frequency modulation (Frequency Modulation, FM), and a Global Positioning System (Global Positioning System, GPS).

Step 202: Receive a connection request of a second device.

The connection request may be a request generated after the second device finds the Wi-Fi access point enabled by the first device. The connection request is used by the second device to request a Wi-Fi connection from the first device.

Step 203: Output first prompt information according to the connection request.

After the connection request is sent by the second device to the first device, the first device responds to the connection request and outputs the first prompt information. The first prompt information indicates that the second device finds the Wi-Fi access point provided by the first device and the second device applies to the first device for the Wi-Fi connection.

In an implementation, the first device outputs the first prompt information by displaying the first prompt information on a screen. For example, the first device may display the first prompt information by using a toast message box, a notification bar, a status bar, or the like. Alternatively, the first device may output the first prompt information by playing a sound. For example, the first device may play the first prompt information by using an audio output device such as a loudspeaker or a headset. Alternatively, the first device may output the first prompt information by displaying the first prompt information on a screen and playing a sound. For example, the first device displays the first prompt information on a display screen and plays the first prompt information by using a loudspeaker.

The first device outputs the first prompt information, to remind a user of the first device that the second device applies for a connection to the Wi-Fi access point provided by the first device. Therefore, when the Wi-Fi access point provided by the first device is a portable Wi-Fi hotspot, the user of the first device is reminded in time that the second device applies for a Wi-Fi connection. In this way, the following case is avoided: The user of the first device cannot learn of a connection status of the portable Wi-Fi hotspot in time, and therefore, a loss is caused due to unknowing consumption of a large amount of traffic data because the second device automatically connects to the portable Wi-Fi hotspot.

The toast is a mechanism used for displaying information in Android. In the toast displaying mechanism, information is displayed without a focus. In addition, in the toast displaying mechanism, a time of displaying information is limited, and the information automatically disappears after the information is displayed for a specific time period.

Figure 2C:
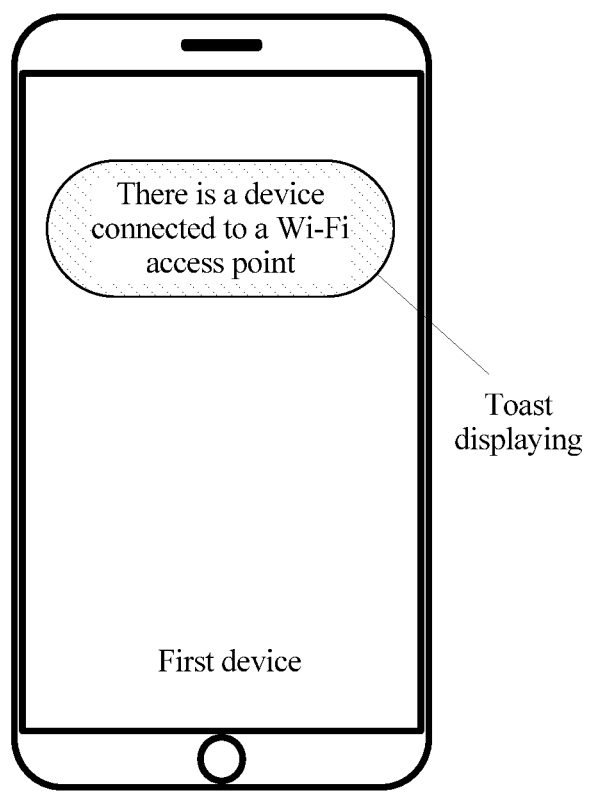

In this embodiment, the first prompt information is displayed by using the toast displaying mechanism, as shown in FIG. 2c, to remind the user of the first device in time that the second device connects to the Wi-Fi access point provided by the first device. In this way, the following case is avoided: When the Wi-Fi access point provided by the first device is a portable Wi-Fi hotspot, the user of the first device cannot learn of a connection status of the portable Wi-Fi hotspot of the first device in time, and therefore, a loss may be caused due to unknowing consumption of a large amount of traffic data. After the first prompt message is displayed by using the toast displaying mechanism, the first prompt message can disappear after a specific time period, and therefore, it does not affect the user of the first device in normally using the device. In this way, user experience is improved.

The status bar means a displaying mechanism of displaying various parameters or statuses of a device in an operating system of the device, for example, a mechanism of displaying a remaining battery capacity. The notification bar uses a mechanism of displaying various push messages in a drop-down manner in an operating system of a device. When a push message appears, the push message may be displayed on a status bar on an uppermost part of a display screen, and may be hidden after a specific time period. The push message is displayed on the display screen again when the user slides down the notification bar for displaying.

Figure 2D:
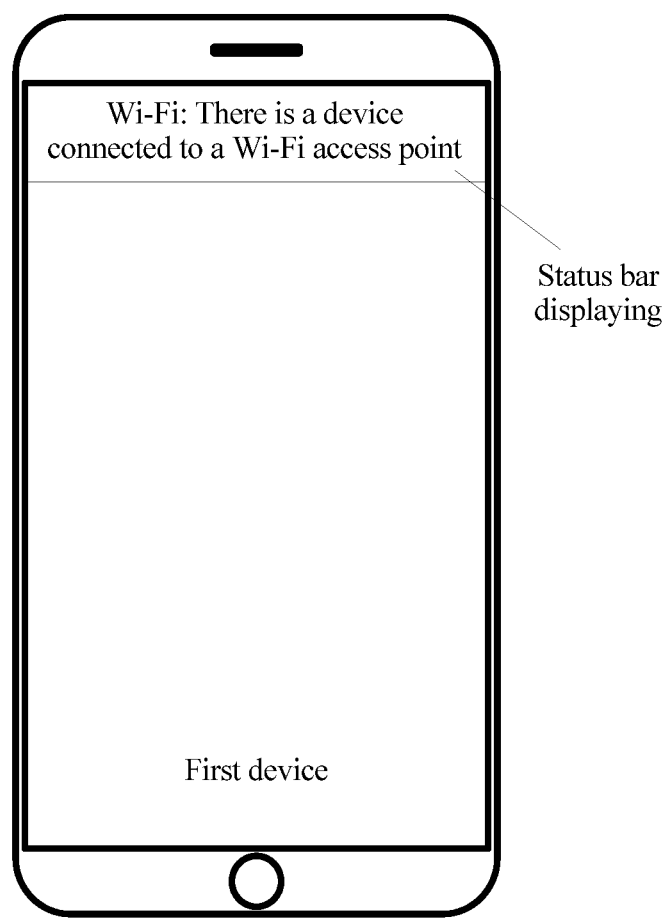
Figure 2E:
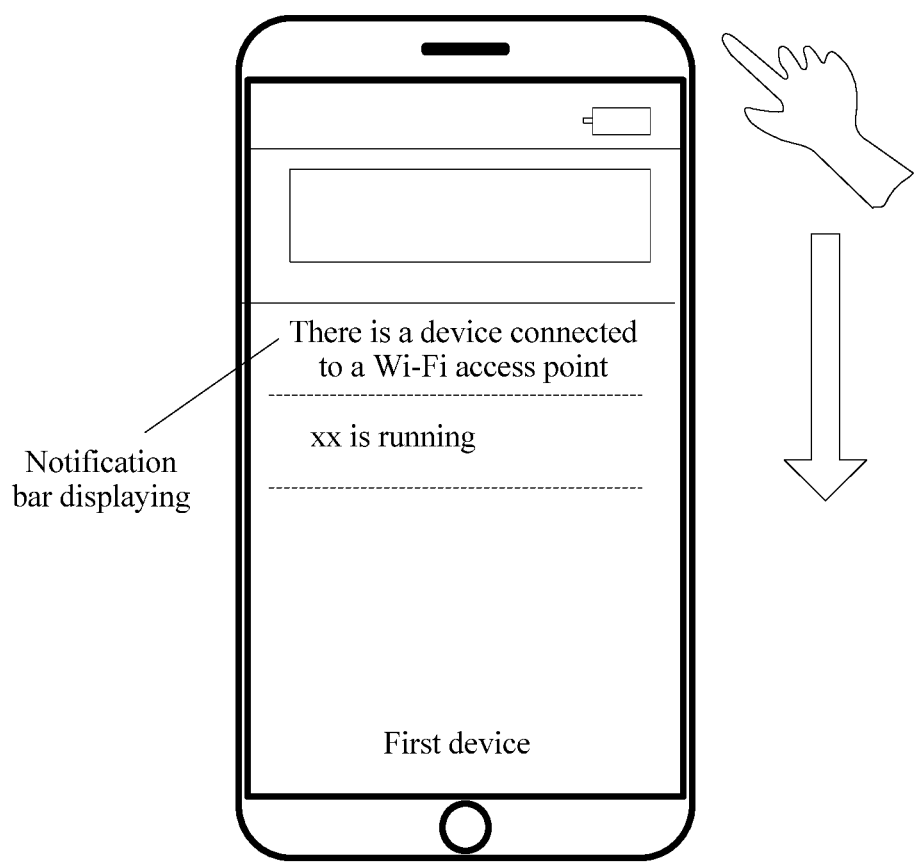

In this embodiment, the first prompt information is displayed by using a status bar displaying mechanism, as shown in FIG. 2d, to remind the user of the first device in time that the second device connects to the Wi-Fi access point provided by the first device. In this way, the following case is avoided: When the Wi-Fi access point provided by the first device is a portable Wi-Fi hotspot, the user of the first device cannot learn of a connection status of the portable Wi-Fi hotspot in time, and therefore, a loss may be caused due to unknowing consumption of a large amount of traffic data. In addition, the first prompt information is hidden after a specific time period, and the first prompt information is displayed on the display screen again when the user slides down the notification bar for displaying, as shown in FIG. 2e (there may further be a message "xx is running" in the notification bar), to reserve information for the user. In this way, the user can be reminded at any time when another device connects to the Wi-Fi access point. Therefore, user benefits are protected, and user experience is improved.

In addition, after receiving the connection request of the second device, the first device may further perform the following steps.

Step 204: Determine whether login information in the connection request is consistent with a login parameter preset for the Wi-Fi access point, and if the login information is consistent with the login parameter, allow the second device to connect to the Wi-Fi access point.

In this application, the determining whether login information is consistent with a login parameter means determining whether a login user name in the login information is consistent with an access point user name in the login parameter, and determining whether a login password in the login information is consistent with an access point connection password in the login parameter. The second device can be used as a legal beneficiary device and allowed to connect to the Wi-Fi access point of the first device only when the login user name is consistent with the access point user name and the login password is consistent with the access point connection password.

It should be noted that after the first device determines that the second device is a legal beneficiary device, a Wi-Fi connection operation is performed between the first device and the second device. In this way, a Wi-Fi connection can be successfully set up.

Alternatively, after the first device determines that the second device is a legal beneficiary device, a Wi-Fi connection operation is performed between the first device and the second device. A Wi-Fi connection between the first device and the second device can be successfully set up only after the second device feeds back information related to connection confirmation (for example, determines to connect to the Wi-Fi access point) to the first device.

It should be noted that the login information in the connection request may be historical login information recorded due to a historical connection of the second device, or may be login information entered by a user of the second device in real time.

Step 205: Send feedback information to the second device.

The feedback information can indicate whether the Wi-Fi access point connected to the second device is a portable Wi-Fi hotspot or a non-portable Wi-Fi hotspot. The feedback information may be implemented through a defined AT command or an identifier.

For example, in this application, the first device transmits a new AT command to the second device to notify the second device whether the Wi-Fi access point to which the second device connects is a portable Wi-Fi hotspot.

In this application, the first device may transmit the feedback information to the second device by using a new interface, or transmit the feedback information to the second device by using an original data transport interface.

In an implementation, step 205 may be performed after step 204, as shown in FIG. 2a. To be specific, after the second device successfully connects to the Wi-Fi access point, the first device sends the feedback information to the second device, to notify the second device whether the Wi-Fi access point to which the second device connects is a portable Wi-Fi hotspot.

Figure 3:
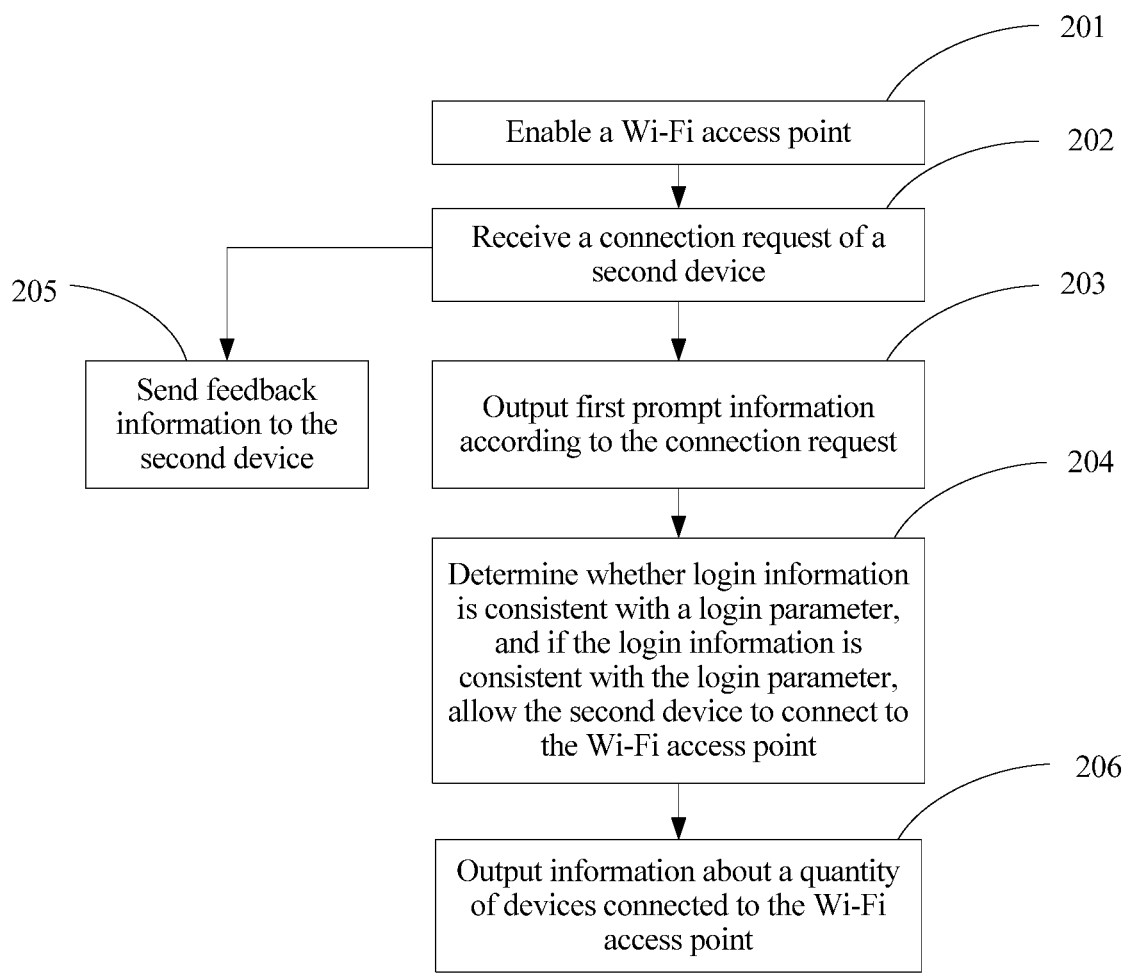
FIG. 3 is another method flowchart for setting up a Wi-Fi connection by a first device according to an embodiment of this application.

Alternatively, step 205 may be performed after step 202, as shown in FIG. 3. To be specific, after the second device sends the connection request to the first device to apply for a Wi-Fi connection, the first device sends the feedback information to the second device, to notify the second device whether the Wi-Fi access point to which the second device connects is a portable Wi-Fi hotspot, and the second device performs subsequent processing based on the feedback information.

In addition, the first device may further perform the following step each time a device connects to the portable Wi-Fi hotspot of the first device.

Step 206: Output information about a quantity of devices connected to the Wi-Fi access point.

In this application, the quantity information may be output by displaying the information on a screen and/or playing a sound, to notify a user in real time of the quantity of devices currently connected to the Wi-Fi access point. In this way, reference data is provided for the user of the first device, so that the user determines whether to disconnect from some devices.

For example, the Wi-Fi access point provided by the first device is a portable Wi-Fi hotspot. Each time a beneficiary device connects to the portable Wi-Fi hotspot of the first device, after obtaining information about a quantity of second devices connected to the portable Wi-Fi hotspot, the first device may display the information about the quantity of second devices connected to the portable Wi-Fi hotspot. For example, "Two connections" or the like is displayed on the first device.

In this way, in this application, the quantity of devices currently connected to the shared portable Wi-Fi hotspot of the user is output in real time, to provide reference data for the user of the first device, so that the user determines whether to disconnect from some devices, thereby protecting benefits of the user.

It should be noted that in this embodiment of this application, a toast displaying mechanism, a notification bar displaying mechanism, or a status bar displaying mechanism may be used to output the information about the quantity of devices connected to the Wi-Fi access point by displaying the information on a screen. For a specific displaying effect, refer to FIG. 2C to FIG. 2e above. Details are not described herein again.

FIG. 4a-i and FIG. 4a-2 are a control flowchart for setting up a Wi-Fi connection by a second device in FIG. 1. FIG. 4a-i and FIG. 4a-2 may include the following steps.

Step 401: Search an ambient environment of the second device for a Wi-Fi access point, to obtain a list of Wi-Fi access points to which the second device can choose to connect.

Figure 5A:
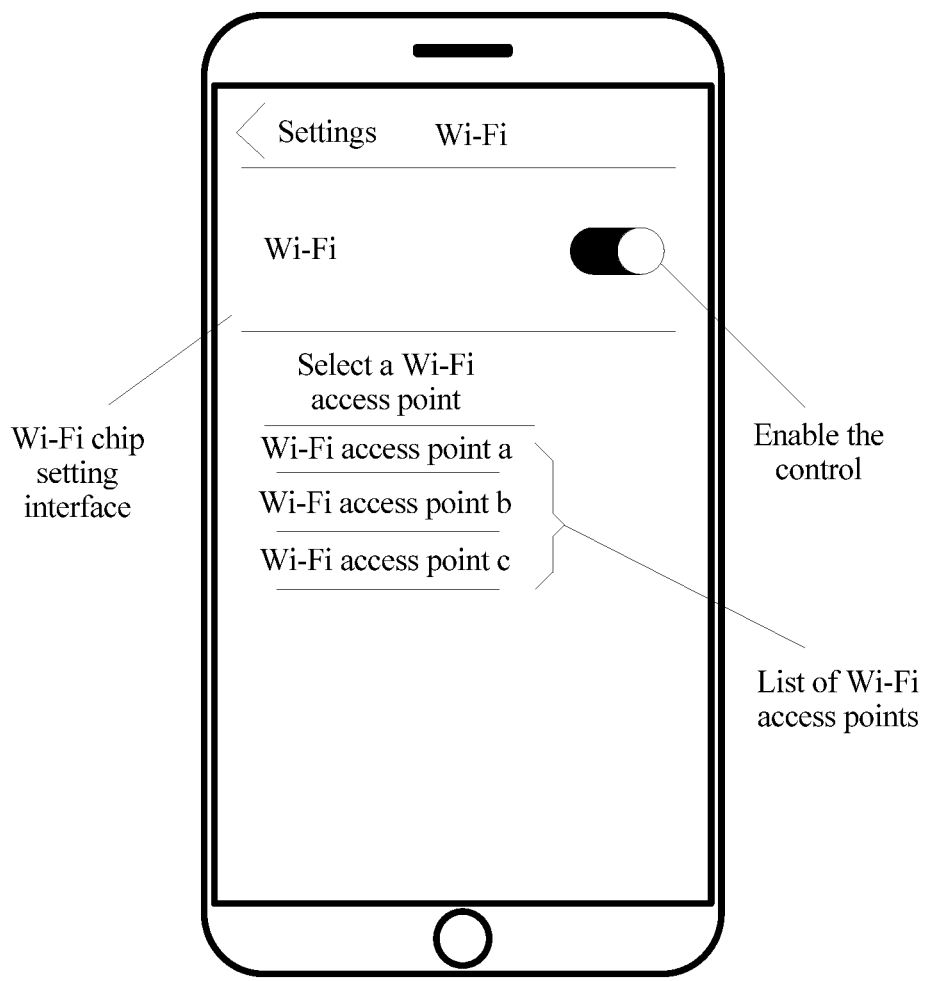
FIG. 5a is a diagram of another application example according to an embodiment of this application.

The second device may enable, by using a control in a setting interface, a function of searching for a Wi-Fi access point. As shown in FIG. 5a, the second device finds a list of Wi-Fi access points to which one or more second devices may connect, for example, a Wi-Fi access point a, a Wi-Fi access point b, or a Wi-Fi access point c.

Step 402: Determine a target access point in the list of Wi-Fi access points.

The second device may use, as the target access point, a Wi-Fi access point that has a most powerful signal coverage capability in the list of Wi-Fi access points, or may use, as the target access point, a Wi-Fi access point whose login user name and login password can be both matched in the list of Wi-Fi access points.

Step 403: Generate a connection request, and send the connection request to a device in which the target access point resides.

The connection request is used by the second device to request a Wi-Fi connection from the device in which the target access point resides, for example, the first device.

After receiving the connection request, the device in which the target access point resides determines whether login information in the connection request is consistent with a login parameter preset for the Wi-Fi access point. If the login information is consistent with the login parameter, the device in which the target access point resides allows the second device to connect to the Wi-Fi access point, and sends feedback information to the second device. The feedback information can indicate whether the Wi-Fi access point to which the second device is to connect is a portable Wi-Fi hotspot or a non-portable Wi-Fi hotspot.

Step 404: Receive feedback information sent by the device in which the target access point resides.

It should be noted that when the second device receives the feedback information sent by the device in which the target access point resides, the second device is in a state in which the device in which the target access point resides allows the second device to connect to the Wi-Fi access point but the Wi-Fi connection is not successfully set up.

Step 405: Determine, based on the feedback information, whether the target access point is a portable Wi-Fi hotspot. If the target access point is a portable Wi-Fi hotspot, perform step 406. If the target access point is not a portable Wi-Fi hotspot, perform step 407.

Step 406: Determine whether a default connection mode is used. If the default connection mode is used, perform step 408. If the default connection mode is not used, perform step 409.

The default connection mode herein means a connection mode that is preset by a user of the second device and that requires to directly connect to a portable Wi-Fi hotspot.

Step 407: Determine whether the device in which the target access point resides allows the second device to connect to the target access point. If the device allows the second device to connect to the target access point, perform step 410. If the device does not allow the second device to connect to the target access point, return to step 402 or step 401, to redetermine a new target access point, and repeat this cycle until the second device connects to a Wi-Fi access point, or the second device cannot find a connectable Wi-Fi access point, and gives up a Wi-Fi connection or retries after waiting for a time period.

Step 408: Output second prompt information, and perform step 407.

The second device may output the second prompt information by displaying the second prompt information on a screen and/or playing a sound. The second prompt information is used to notify the user of the second device that the Wi-Fi access point to which the second device is to connect is a portable Wi-Fi hotspot, and further notify that consumption of a large amount of traffic may cause inconvenience to a device user providing the portable Wi-Fi hotspot, and so on.

It should be noted that the second device may display the second prompt information by using a toast, a notification bar, a status bar, or the like. For a specific display effect of the second prompt information, refer to FIG. 2C to FIG. 2e above. Details are not described herein again.

Step 409: Receive an input operation of the user, and perform step 411.

The input operation indicates whether the user of the second device needs to connect to the target access point that belongs to a portable Wi-Fi hotspot. In other words, after receiving the feedback information, the second device has learned that the target access point is a portable Wi-Fi hotspot, so that the user can determine whether to connect to the portable Wi-Fi hotspot.

Step 410: Connect to the target access point.

Step 411: Determine whether the input operation indicates that a user of the second device needs to connect to the target access point. If the input operation indicates that the user of the second device needs to connect to the target access point, perform step 408. If the input operation does not indicate that the user of the second device needs to connect to the target access point, return to step 402 or step 401, to redetermine a new target access point, and repeat this cycle until the second device connects to a Wi-Fi access point, or the second device cannot find a connectable Wi-Fi access point, and gives up a Wi-Fi connection or retries after waiting for a time period.

In other words, if the second device finds, based on the feedback information, that the target access point is not a portable Wi-Fi hotspot, the second device does not need to consider whether a loss is caused to a device user, but can directly connect to the target access point based on a comparison result returned by the device in which the target access point resides, or go back to the foregoing steps. Certainly, when the second device connects to the target access point, the login information in the connection request sent by the second device is consistent with the login parameter of the target access point.

Figures 1, 4A:
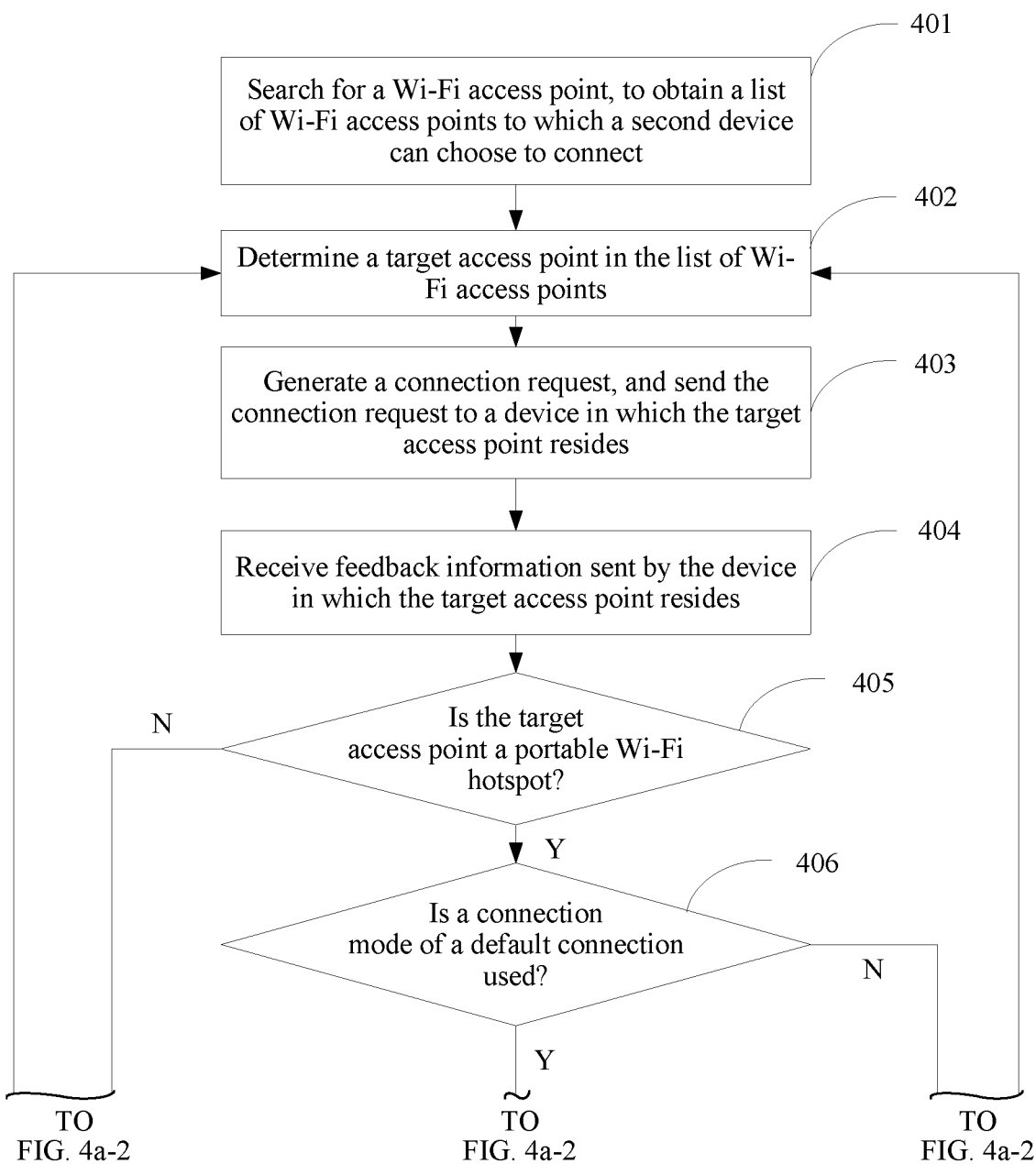
Figures 2, 4A:
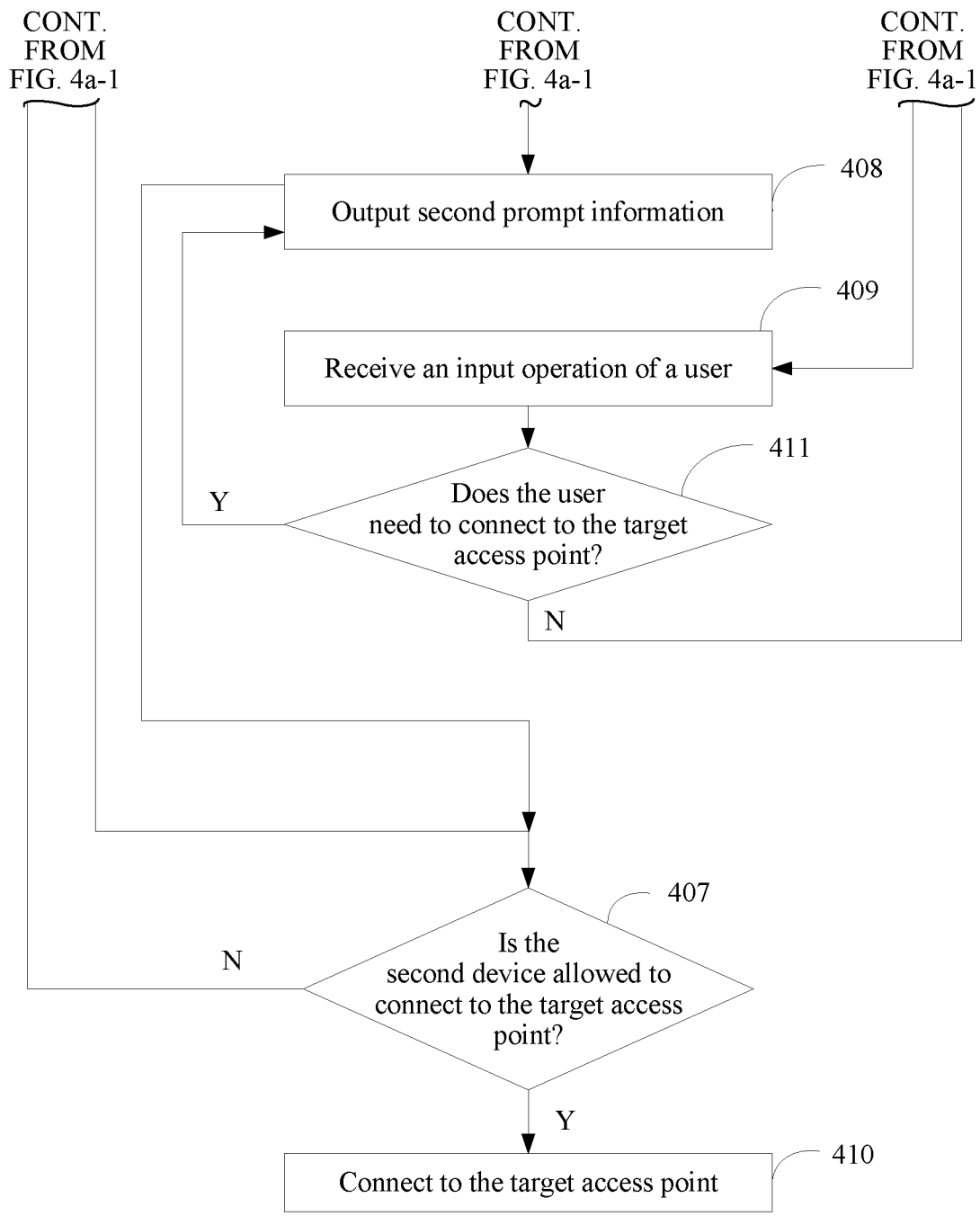
Figure 4B:
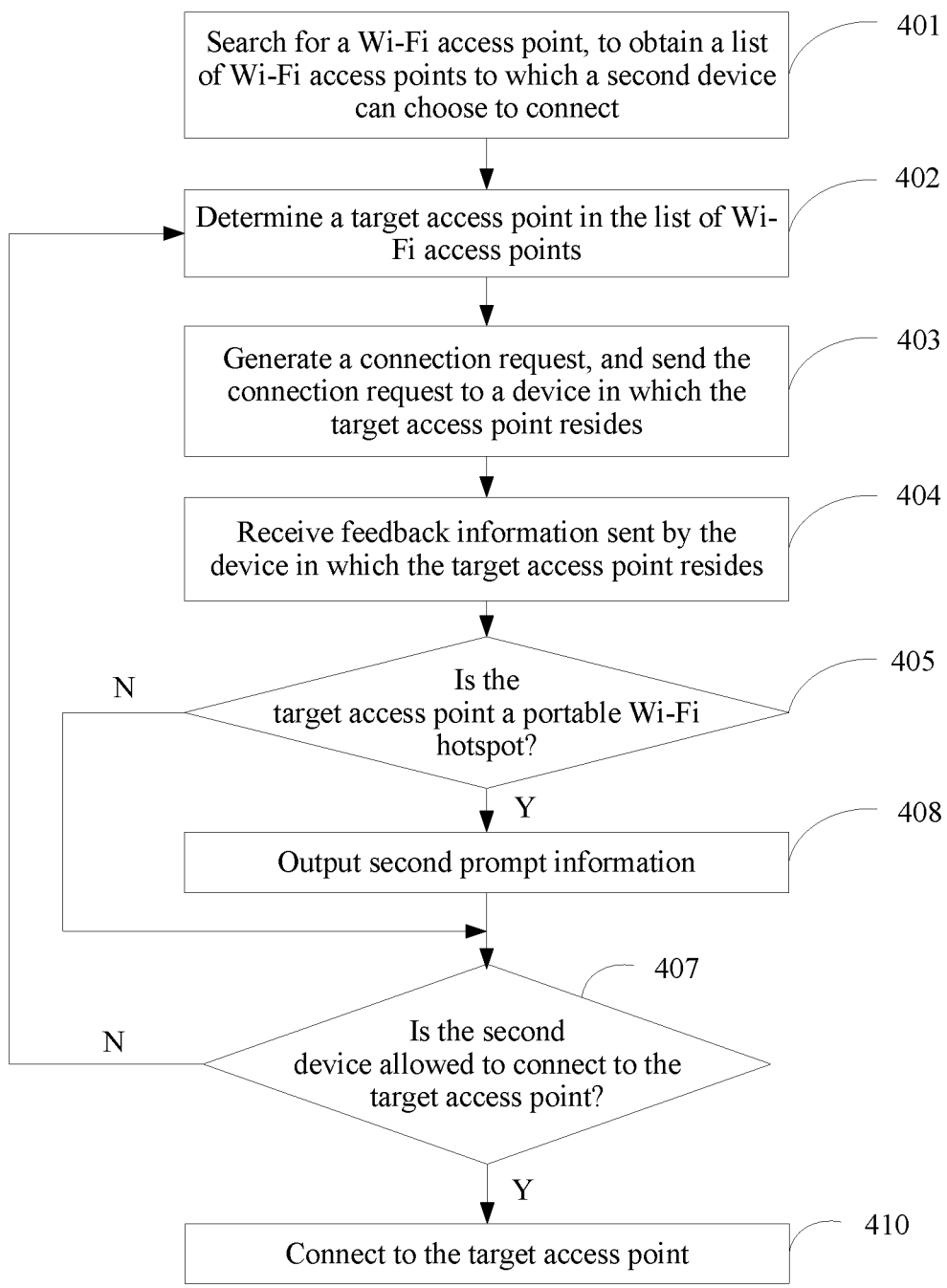

Alternatively, in an implementation, step 406, step 409, and step 411 in FIG. 4*a*-1 and FIG. 4*a*-2 do not need to be performed, as shown in FIG. 4*b*:

Step 401: Search an ambient environment of the second device for a Wi-Fi access point, to obtain a list of Wi-Fi access points to which the second device can choose to connect.

Step 402: Determine a target access point in the list of Wi-Fi access points.

Step 403: Generate a connection request, and send the connection request to a device in which the target access point resides.

After receiving the connection request, the device in which the target access point resides determines whether login information in the connection request is consistent with a login parameter preset for the Wi-Fi access point. If the login information is consistent with the login parameter, the device in which the target access point resides allows the second device to connect to the Wi-Fi access point.

Step 404: Receive feedback information sent by the device in which the target access point resides.

Step 405: Determine, based on the feedback information, whether the target access point is a portable Wi-Fi hotspot. If the target access point is a portable Wi-Fi hotspot, perform step 408. If the target access point is not a portable Wi-Fi hotspot, perform step 407.

Step 407: Determine whether the device in which the target access point resides allows the second device to connect to the target access point. If the device allows the second device to connect to the target access point, perform step 410. If the device does not allow the second device to connect to the target access point, return to step 402 or step 401, to redetermine a new target access point, and repeat this cycle until the second device connects to a Wi-Fi access point, or the second device cannot find a connectable Wi-Fi access point and gives up a Wi-Fi connection.

Step 408: Output second prompt information, and perform step 407.

Step 410: Connect to the target access point.

In other words, after sending the connection request to the device in which the target access point resides, and receiving the feedback information, when the second device learns that the target access point is a portable Wi-Fi hotspot, the second device does not need to further determine whether a user sets a default connection mode before, and does not need to consider an operation of the user. Instead, after the user of the second device is notified that the second device is to connect to a portable Wi-Fi hotspot, when the device in which the target access point resides allows a connection from the second device, the second device directly connects to the target access point, thereby setting up the Wi-Fi connection.

In another implementation, steps in FIG. 4*a*-*i* and FIG. 4*a*-2 may be alternatively performed in the following order, as shown in FIG. 4*c*-*i* and FIG. 4*c*-2:

Step 401: Search an ambient environment of the second device for a Wi-Fi access point, to obtain a list of Wi-Fi access points to which the second device can choose to connect.

Step 402: Determine a target access point in the list of Wi-Fi access points.

Step 404: Receive feedback information sent by a device in which the target access point resides.

Step 405: Determine, based on the feedback information, whether the target access point is a portable Wi-Fi hotspot. If the target access point is a portable Wi-Fi hotspot, perform step 406. If the target access point is not a portable Wi-Fi hotspot, perform step 403.

Step 406: Determine whether a default connection mode is used. If the default connection mode is used, perform step 408. If the default connection mode is not used, perform step 409.

Step 403: Generate a connection request, and send the connection request to the device in which the target access point resides.

After receiving the connection request, the device in which the target access point resides determines whether login information in the connection request is consistent with a login parameter preset for the Wi-Fi access point. If the login information is consistent with the login parameter, the device in which the target access point resides allows the second device to connect to the Wi-Fi access point.

Step 407: Determine whether the device in which the target access point resides allows the second device to connect to the target access point. If the device allows the second device to connect to the target access point, perform step 410. If the device does not allow the second device to connect to the target access point, return to step 402 or step 401, to redetermine a new target access point, and repeat this cycle until the second device connects to a Wi-Fi access point, or the second device cannot find a connectable Wi-Fi access point and gives up a Wi-Fi connection.

Step 408: Output second prompt information, and perform step 403.

Step 409: Receive an input operation of the user, and perform step 411.

Step 410: Connect to the target access point.

Step 411: Determine whether the input operation indicates that a user of the second device needs to connect to the target access point. If the input operation indicates that the user of the second device needs to connect to the target access point, perform step 408. If the input operation does not indicate that the user of the second device needs to connect to the target access point, return to step 402 or step 401, to redetermine a new target access point, and repeat this cycle until the second device connects to a Wi-Fi access point, or the second device cannot find a connectable Wi-Fi access point and gives up a Wi-Fi connection.

Figures 1, 4C:
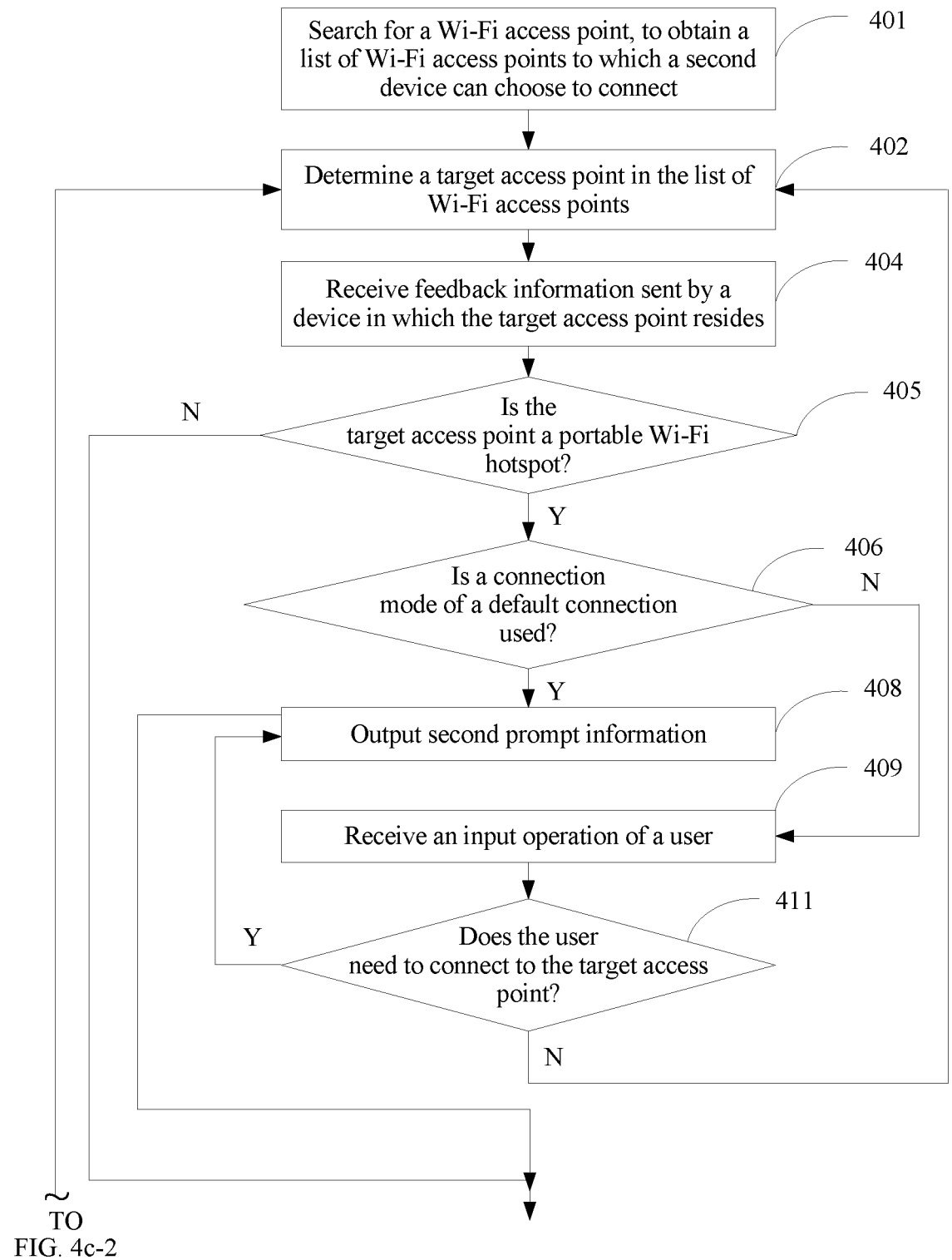
Figures 2, 4C:
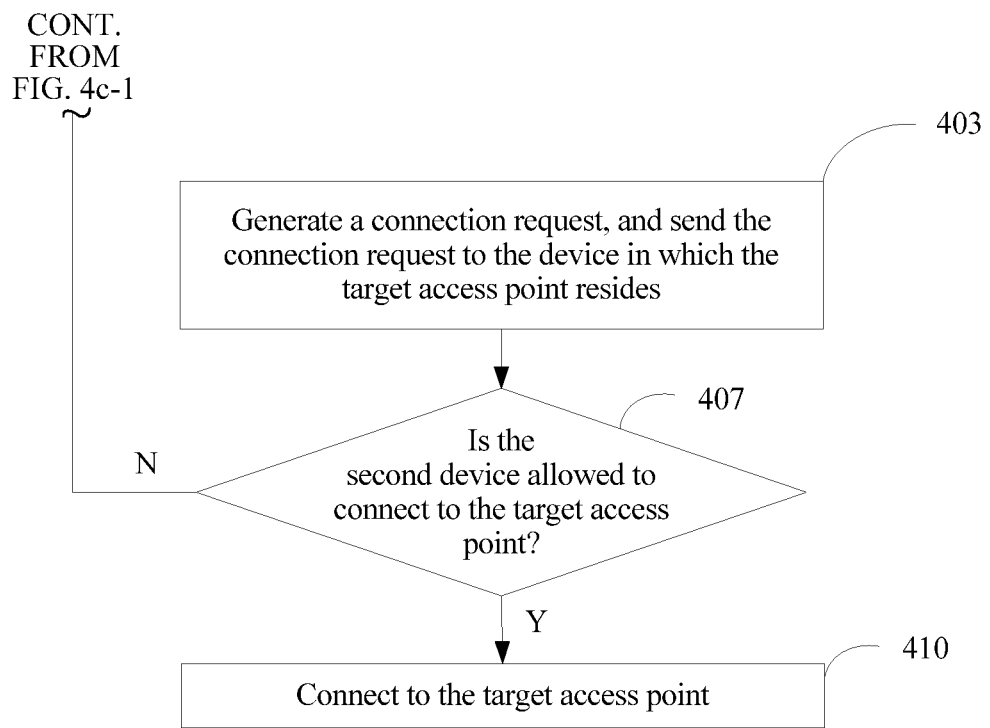
Figure 4D:
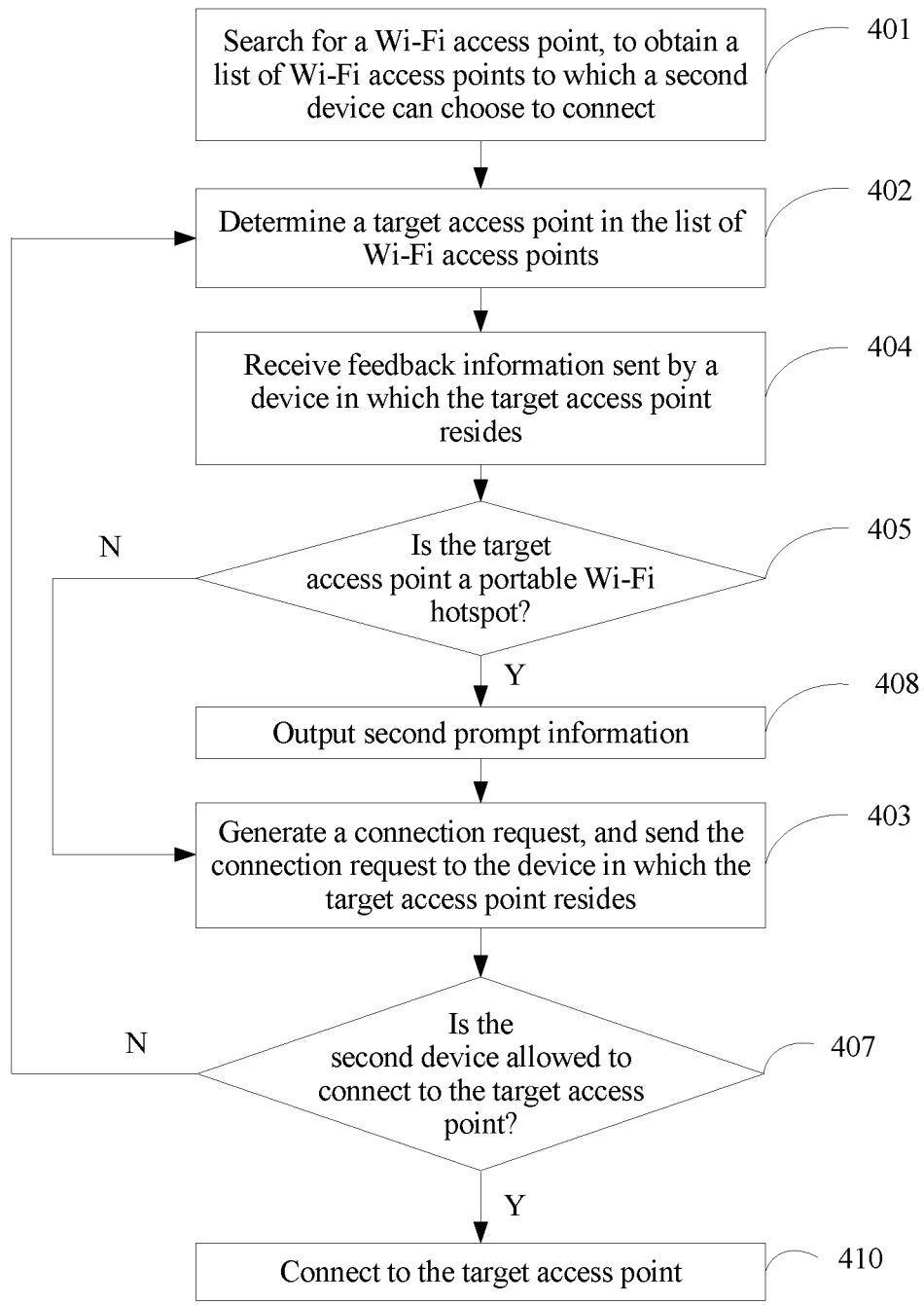

Alternatively, step 406, step 409, and step 411 in FIG. 4c-1 and FIG. 4c-2 do not need to be performed, as shown in FIG. 4d:

Step 401: Search an ambient environment of the second device for a Wi-Fi access point, to obtain a list of Wi-Fi access points to which the second device can choose to connect.

Step 402: Determine a target access point in the list of Wi-Fi access points.

Step 404: Receive feedback information sent by a device in which the target access point resides.

Step 405: Determine, based on the feedback information, whether the target access point is a portable Wi-Fi hotspot. If the target access point is a portable Wi-Fi hotspot, perform step 408. If the target access point is not a portable Wi-Fi hotspot, perform step 403.

Step 403: Generate a connection request, and send the connection request to the device in which the target access point resides.

After receiving the connection request, the device in which the target access point resides determines whether login information in the connection request is consistent with a login parameter preset for the Wi-Fi access point. If the login information is consistent with the login parameter, the device in which the target access point resides allows the second device to connect to the Wi-Fi access point.

Step 407: Determine whether the device in which the target access point resides allows the second device to connect to the target access point. If the device allows the second device to connect to the target access point, perform step 410. If the device does not allow the second device to connect to the target access point, return to step 402 or step 401, to redetermine a new target access point, and repeat this cycle until the second device connects to a Wi-Fi access point, or the second device cannot find a connectable Wi-Fi access point and gives up a Wi-Fi connection.

Step 408: Output second prompt information, and perform step 403.

Step 410: Connect to the target access point.

In other words, after receiving the feedback information, when the second device learns that the target access point is a portable Wi-Fi hotspot, the second device does not need to further determine whether a user sets a default connection mode before, and does not need to consider an operation of the user. Instead, after notifying the user of the second device that the second device is to connect to a portable Wi-Fi hotspot, the second device directly sends the connection request to the device in which the target access point resides, so that when being allowed to connect to the target access point, the second device directly connects to the target access point, thereby setting up a Wi-Fi connection.

Figure 5B:
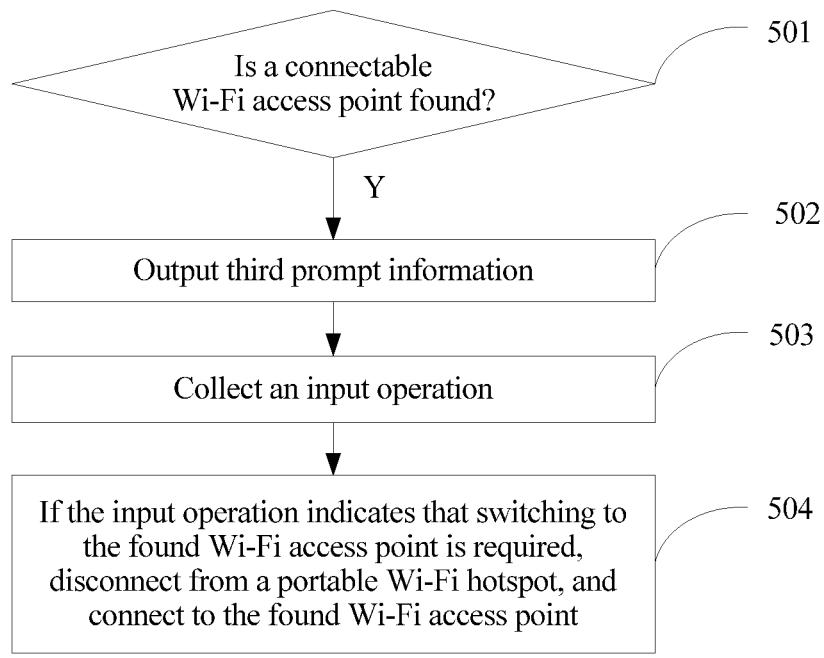
FIG. 5b and FIG. 5c are respectively other method flowcharts for setting up a Wi-Fi connection by a second device according to an embodiment of this application.

In addition, as shown in steps in FIG. 5b, after successfully connecting to the portable Wi-Fi hotspot, the second device in FIG. 1 searches for a new connectable Wi-Fi access point, so that the second device can be switched to a non-portable Wi-Fi hotspot as soon as possible. In this way, more traffic consumption is avoided for the device in which the target access point resides.

Step 501: Monitor whether a Wi-Fi access point whose login parameter is consistent with login information in a connection request can be found. If the Wi-Fi access point is found, perform step 502.

The found Wi-Fi access point may be a new portable Wi-Fi hotspot, or may be a non-portable Wi-Fi access point.

The connection request is an instruction that is sent, to a device in which the Wi-Fi access point resides, by the second device when the Wi-Fi access point is found, and the connection request is used to request a Wi-Fi connection from the device in which the Wi-Fi access point resides.

Step 502: Output third prompt information, and perform step 503.

The third prompt information is used to remind a user of the second device that whether the second device is switched to a new portable Wi-Fi hotspot or switched to a non-portable Wi-Fi access point, so that the user can perform an input operation based on a requirement.

It should be noted that the second device may output the third prompt information by displaying the third prompt information on a screen and/or playing a sound. The second device may specifically display the third prompt information by using a toast, a notification bar, a status bar, or the like. For a specific display effect of the third prompt information, refer to FIG. 2C to FIG. 2e above. Details are not described herein again.

Step 503: Collect an input operation, and perform step 504.

The input operation may be an input operation performed on a control by the user of the second device based on the third prompt information, to indicate that the user needs to be switched to the found Wi-Fi access point or continue to maintain the connection to the portable Wi-Fi hotspot.

Step 504: If the input operation indicates that switching to the found Wi-Fi access point is required, disconnect from the portable Wi-Fi hotspot, and connect to the found Wi-Fi access point.

In other words, in this application, when finding a new connectable Wi-Fi access point (a user name and a password are successfully matched), the second device reminds the user of the second device whether the second device needs to be switched to the new Wi-Fi access point for use.

Figure 5C:
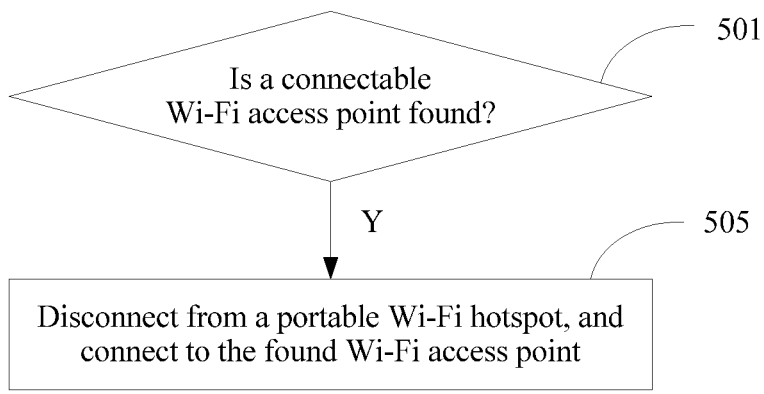

Alternatively, the user of the second device may preset a parameter for the second device, to authorize the second device to directly disconnect from the current Wi-Fi connection and connect to the found new access point, when a new Wi-Fi access point is found. As shown in FIG. 5c, when it is monitored in step 501 that the Wi-Fi access point whose login parameter is consistent with the login information in the connection request is found, step 504 may be directly performed to disconnect from the portable Wi-Fi hotspot and connect to the found Wi-Fi access point, thereby implementing an automatic switching function.

It can be learned that in this application, when two devices set up a Wi-Fi hotspot connection, a device providing a Wi-Fi hotspot, namely, a supply device, knows that the device is providing a portable Wi-Fi hotspot, but a device that needs to connect to the Wi-Fi hotspot, namely, a beneficiary device, does not know. In this case, a newly defined AT command or an identifier needs to be added as parameter (feedback information) for transferring when the Wi-Fi connection is set up between the two devices. In this way, when receiving the AT command or the identifier of the supply device, the beneficiary device can identify that the supply device is a portable Wi-Fi hotspot, for example, a mobile phone Wi-Fi hotspot, and perform a corresponding operation, for example, notify corresponding information to a user of the beneficiary device.

Therefore, in this application, the user is reminded when the portable Wi-Fi hotspot provided by the supply device has a new connection, and the supply device may further notify the user in real time of a quantity of devices currently connected to the shared mobile hotspot.

In addition, to use a portable Wi-Fi hotspot of another device, the beneficiary device may perform selection based on fixed traffic or a fixed time, and a user requirement. For example, after the user performs a triggering input operation, the beneficiary device may be disconnected. In addition, when the beneficiary device finds that a connection identifier is Wi-Fi provided by a portable mobile hotspot, the beneficiary device determines, based on an option preset by the user, whether to automatically connect to the Wi-Fi. When the beneficiary device automatically connects to the portable mobile Wi-Fi hotspot, the beneficiary device reminds the user, for example, by using a toast, a notification bar, a status bar, or the like. When there is connectable Wi-Fi (a password is successfully matched), the beneficiary device reminds the user whether to switch to the new Wi-Fi for use. When the user performs selection and authorization in advance based on a requirement, the beneficiary device may provide an automatic switching function.

Figure 6:
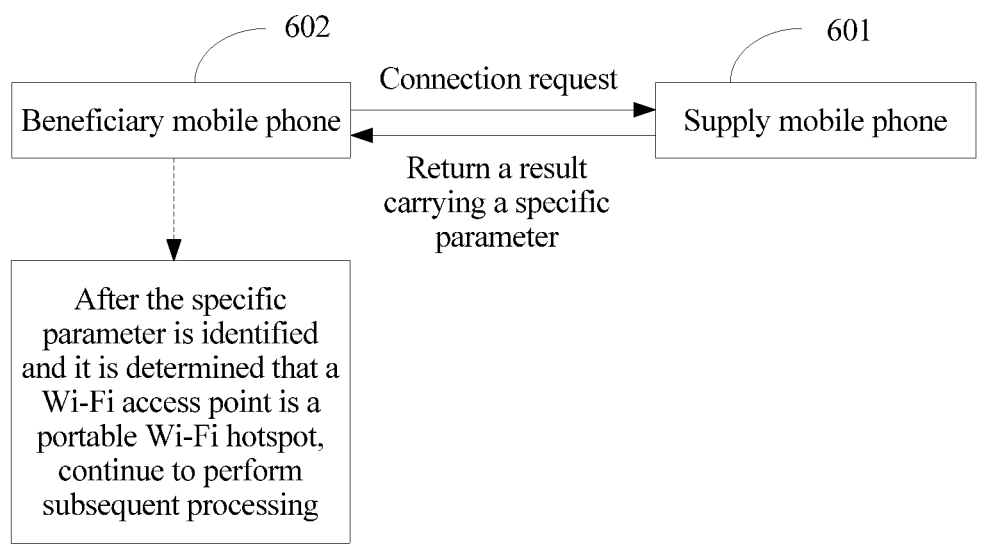
FIG. 6 to FIG. 8 are respectively diagrams of other application examples according to an embodiment of this application.

For example, both the first device and the second device in FIG. 1 are mobile phones. A mobile phone providing a portable Wi-Fi hotspot is a supply mobile phone 601, and a mobile phone that needs to connect to the Wi-Fi access point is a beneficiary mobile phone 602. FIG. 6 is a diagram of an interaction example of setting up a Wi-Fi connection between the two mobile phones in FIG. 1.

On a side of the supply mobile phone 601, after receiving a connection request sent by the beneficiary mobile phone 602, the supply mobile phone 601 feeds back, to the beneficiary mobile phone 602, result information carrying a specific parameter. The specific parameter herein indicates whether the Wi-Fi access point provided by the supply mobile phone 601 is a portable Wi-Fi hotspot. In addition, after the beneficiary mobile phone 602 is connected to the portable Wi-Fi hotspot provided by the supply mobile phone 601, the supply mobile phone 601 outputs first prompt information to a user of the supply mobile phone 601, and allows the beneficiary mobile phone 602 to connect to the portable Wi-Fi hotspot.

On a side of the beneficiary mobile phone 602, when finding the Wi-Fi hotspot provided by the supply mobile phone 601 by using a Wi-Fi search function, the beneficiary mobile phone 602 sends the connection request to the supply mobile phone 601, and receives the specific parameter fed back by the supply mobile phone 601. After identifying the specific parameter, the beneficiary mobile phone 602 determines whether the Wi-Fi access point connected or to be connected to the beneficiary mobile phone 602 is a portable Wi-Fi hotspot, and continues an upper-layer policy based on this. For example, the beneficiary mobile phone 602 reminds a user of the beneficiary mobile phone 602, matches a user name and a password, and connects to the portable Wi-Fi hotspot.

It should be noted that FIG. 6 shows merely a Wi-Fi connection manner between two mobile phones. In addition, manners such as adding an AT command, adding an interface, and defining a specific parameter may be further used, so that the beneficiary mobile phone 602 clearly learns, in these manners, that the Wi-Fi access point to which the beneficiary mobile phone 602 connects is a portable Wi-Fi hotspot. After clearly learning that the Wi-Fi access point to which the beneficiary mobile phone 602 connects is a portable Wi-Fi hotspot, the beneficiary mobile phone 602 may further perform an upper-layer policy. For example, the beneficiary mobile phone 602 may show, to the user in various ways, that the Wi-Fi access point to which the beneficiary mobile phone 602 connects is a Wi-Fi hotspot of a specific mobile terminal, and a data traffic loss may be caused to other people. In this case, the user may select another standby data traffic use manner, for example, search for a new Wi-Fi access point.

Figure 7:
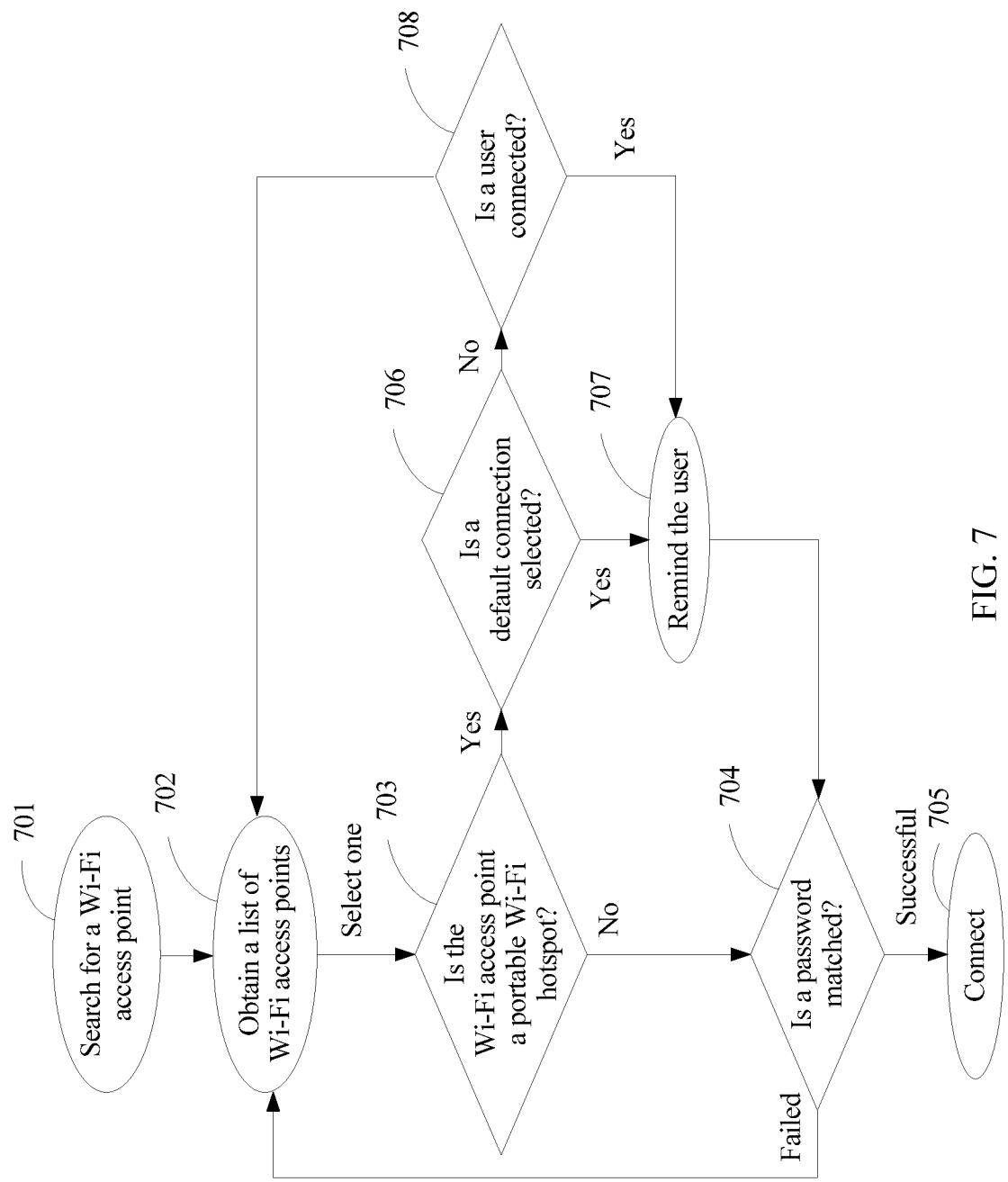

FIG. 7 is a schematic diagram of controlling a Wi-Fi connection by the beneficiary mobile phone 602 in FIG. 6. In FIG. 7, the beneficiary mobile phone 602 may first perform step 701: Search for a nearby Wi-Fi access point. Then, the beneficiary mobile phone 602 obtains a list of Wi-Fi access points by performing step 702. After selecting one Wi-Fi access point in the list, the beneficiary mobile phone 602 performs step 703: Determine whether the Wi-Fi access point is a portable Wi-Fi hotspot. If the Wi-Fi access point is not a portable Wi-Fi hotspot, the beneficiary mobile phone 602 performs step 704: Directly match a user name and a password. When the user name and the password are successfully matched, the beneficiary mobile phone 602 performs step 705: Set up a Wi-Fi connection. If the Wi-Fi access point is a portable Wi-Fi hotspot, the beneficiary mobile phone 602 needs to perform step 706: Determine whether a default connection is preselected by the user. If the default connection is preselected by the user, the beneficiary mobile phone 602 performs step 707: Remind the user of the beneficiary mobile phone 602. Then, the beneficiary mobile phone 602 performs step 704 and step 705 to match the user name and the password and set up the Wi-Fi connection. If the default connection is not preselected by the user, the beneficiary mobile phone 602 needs to perform step 708: Collect an input operation of the user, to determine whether the user needs to set up a Wi-Fi connection to the portable Wi-Fi hotspot. When the user determines to set up the Wi-Fi connection, the beneficiary mobile phone 602 performs step 707: Remind the user of the beneficiary mobile phone 602. Then, the beneficiary mobile phone 602 performs step 704 and step 705 to match the user name and the password and set up the Wi-Fi connection. When the user name and the password fail to be matched, the beneficiary mobile phone 602 may return to step 702 to reselect a Wi-Fi access point in the list of Wi-Fi access points, and repeat the foregoing processing procedures, until the beneficiary mobile phone 602 sets up the Wi-Fi connection.

It should be noted that in FIG. 7, the Wi-Fi connection set up by the beneficiary mobile phone 602 when the Wi-Fi connection is successfully set up may be a Wi-Fi connection provided by a portable Wi-Fi hotspot, or may be a Wi-Fi connection provided by a non-portable Wi-Fi hotspot.

Figure 8:
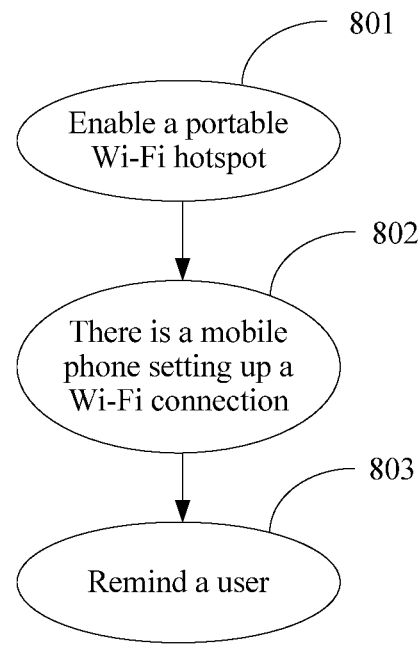

FIG. 8 is a schematic diagram of controlling a Wi-Fi connection by the supply mobile phone 601 in FIG. 6. In FIG. 8, the supply mobile phone 601 performs step 801: Enable a portable Wi-Fi hotspot. Then, in step 802, when finding that the beneficiary mobile phone 602 applies for the Wi-Fi connection, the supply mobile phone 601 may perform step 803 to choose to remind the user of the supply mobile phone 601. For example, the supply mobile phone 601 may proactively notify or clearly display information such as a newly connected beneficiary mobile phone 602 and a quantity of current connections by using a toast, a status bar, or a notification bar. In this way, when the beneficiary mobile phone 602 connects to the Wi-Fi hotspot of the supply mobile phone 601, the supply mobile phone 601 triggers a proactive prompting action, instead of waiting for status query, to remind the user in time, and avoid a traffic loss unknown to the user.

It can be learned from the foregoing example that when connecting to Wi-Fi, if the beneficiary device of two devices setting up a Wi-Fi connection determines that a Wi-Fi source to which the beneficiary device is to connect is a portable Wi-Fi hotspot, the beneficiary device cannot directly automatically connect to the Wi-Fi source, but needs to obtain a real-time operation opinion or a default opinion of a user before determining whether to connect to the Wi-Fi source; and if the beneficiary device needs to connect to the Wi-Fi source, the beneficiary device needs to clearly notify the user that the beneficiary device is connecting to a portable Wi-Fi hotspot. In other words, when encountering a portable mobile Wi-Fi hotspot source during Wi-Fi polling, the beneficiary device consults the user about an opinion (selection or preselection). When this type of Wi-Fi source is to be connected, the beneficiary device obviously reminds the user.

In conclusion, in this application, the user is reminded in time when another device sets up a Wi-Fi connection to a device providing a portable Wi-Fi hotspot. This resolves a problem that a high traffic fee is generated because the user forgets to disable a Wi-Fi hotspot or incorrectly triggers a Wi-Fi hotspot, and resolves a problem that a traffic loss is caused after a Wi-Fi hotspot is enabled by the user and be connected by another device without the user's consent. For example, the user wants to enable the Wi-Fi hotspot for only one device; however, a plurality of devices in a coverage range of the hotspot set up a connection to the supply device before, and consequently, the plurality of devices concurrently consume mobile data traffic of the user without the user's consent. In addition, in this application, when connecting to the portable Wi-Fi hotspot, a beneficiary device reminds the user in time to perform processing, for example, disconnecting from the portable Wi-Fi hotspot and applying for another Wi-Fi connection. This resolves a problem that the user consumes mobile data traffic of another device without the user's consent.

Figure 9:
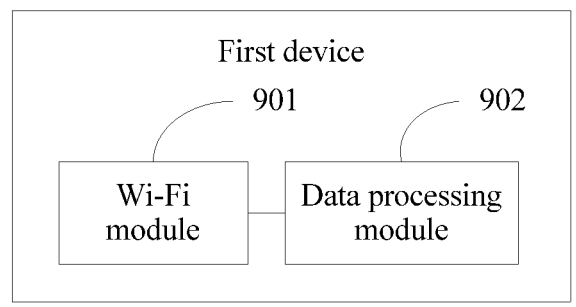
FIG. 9 and FIG. 10 are schematic structural diagrams of a first device according to an embodiment of this application.

FIG. 9 is a schematic structural diagram of the first device in FIG. 1. The device may include the following modules.

A Wi-Fi module 901 is configured to enable a Wi-Fi access point of the first device.

A function of the Wi-Fi module 901 may be implemented based on a Wi-Fi chip. The Wi-Fi module 901 is configured to provide a Wi-Fi connection, thereby transmitting Wi-Fi data and implementing a Wi-Fi communication function.

A data processing module 902 is configured to: receive a connection request of a second device, and send feedback information to the second device according to the connection request, where the feedback information indicates whether the Wi-Fi access point is a portable Wi-Fi hotspot.

A function of the data processing module 902 may be implemented based on a chip such as a processor.

In this embodiment, for specific function implementations of the Wi-Fi module 901 and the data processing module 902, refer to the method part above. Details are not described herein again.

It can be learned that in this embodiment, a device providing a Wi-Fi access point feeds back, to a device applying for a Wi-Fi connection, information that can indicate whether the Wi-Fi access point is a portable Wi-Fi hotspot, so that the device applying for the Wi-Fi connection is reminded in time that the Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

Figure 10:
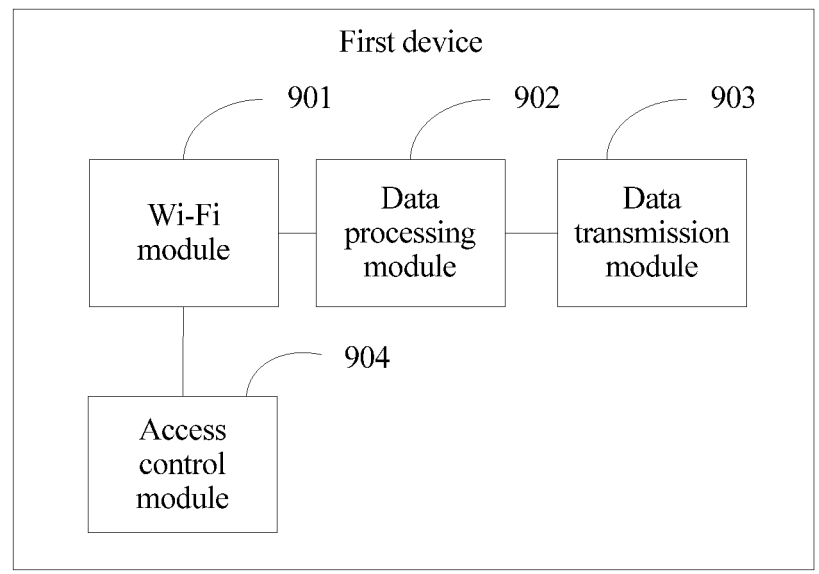

FIG. 10 is another schematic structural diagram of the first device in FIG. 1. In addition to the Wi-Fi module 901 and the data processing module 902, the device may further include the following modules.

A data output module 903 is configured to: output first prompt information according to the connection request, and/or output information about a quantity of devices connected to the Wi-Fi access point.

A function of the data output module 903 may be implemented based on various output devices such as a display screen or a loudspeaker.

An access control module 904 is configured to: determine whether login information in the connection request is consistent with a login parameter preset for the Wi-Fi access point, and if the login information is consistent with the login parameter, allow the second device to connect to the Wi-Fi access point.

A function of the access control module 904 may be implemented based on a control chip, a processor, or the like that has a logic control function.

It should be noted that for specific function implementations of the data output module 903 and the access control module 904, refer to the method part above. Details are not described herein again.

Figure 11:
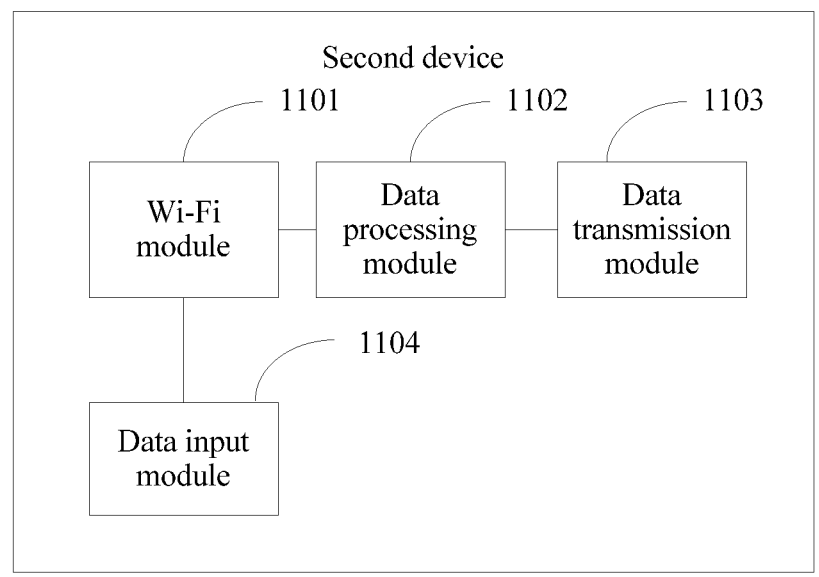
FIG. 11 is a schematic structural diagram of a second device according to an embodiment of this application.

FIG. 11 is a schematic structural diagram of the second device in FIG. 1. The device may include the following modules.

A Wi-Fi module 1101 is configured to search an ambient environment of the second device for a Wi-Fi access point, to obtain a list of Wi-Fi access points to which the second device can choose to connect, where the list of Wi-Fi access points includes at least one Wi-Fi access point.

A function of the Wi-Fi module 1101 may be implemented based on a Wi-Fi chip and the Wi-Fi module 1101 is configured to provide a Wi-Fi connection, thereby transmitting Wi-Fi data and implementing a Wi-Fi communication function.

A data processing module 1102 is configured to: determine a target access point in the list of Wi-Fi access points; send a connection request to a device in which the target access point resides; and receive feedback information that is returned, according to the connection request, by the device in which the target access point resides, where the feedback information indicates whether the target access point is a portable Wi-Fi hotspot.

A function of the data processing module 1102 may be implemented based on a chip such as a processor.

A data output module 1103 is configured to: if the feedback information indicates that the target access point is a portable Wi-Fi hotspot, output second prompt information, where the second prompt information is used to remind a user of the second device that the target access point is a portable Wi-Fi hotspot.

A function of the data output module 1103 may be implemented based on an output device such as a display screen and/or a loudspeaker.

In addition, the Wi-Fi module 1101 is further configured to set up a Wi-Fi connection to the target access point.

In addition, the data processing module 1102 may be further configured to: if the feedback information indicates that the target access point is a portable Wi-Fi hotspot, determine whether a default connection mode is used, where if the default connection mode is used, the data output module 1103 outputs the second prompt information, and the Wi-Fi module 1101 sets up a Wi-Fi connection to the target access point.

The data processing module 1102 may be further configured to: if the default connection mode is not used, receive an input operation of the user; and determine whether the input operation indicates that the user of the second device needs to connect to the target access point, where if the input operation indicates that the user of the second device needs to connect to the target access point, the data output module outputs the second prompt information, and the Wi-Fi module 1101 sets up a Wi-Fi connection to the target access point.

In addition, the Wi-Fi module 1101 is specifically configured to: determine whether login information of the second device is consistent with a login parameter of the target access point; and if the login information of the second device is consistent with the login parameter of the target access point, connect to the target access point. The Wi-Fi module 1101 may be further configured to monitor whether a Wi-Fi access point whose login parameter is consistent with login information in the connection request is found, where if the Wi-Fi access point is found, the data output module 1103 outputs third prompt information.

In addition, the second device may further include: a data input module 1104, configured to collect an input operation, where when the input operation indicates that switching to the found Wi-Fi access point is required, the Wi-Fi module 1101 disconnects from the target access point, and sets up a Wi-Fi connection to the found Wi-Fi access point.

It can be learned that in this embodiment, that connected Wi-Fi is a portable Wi-Fi hotspot can be identified in time by receiving feedback information sent by a device providing the Wi-Fi access point. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

For specific implementations of various module functions in this embodiment, refer to the method part above. Details are not described herein again.

Figure 12:
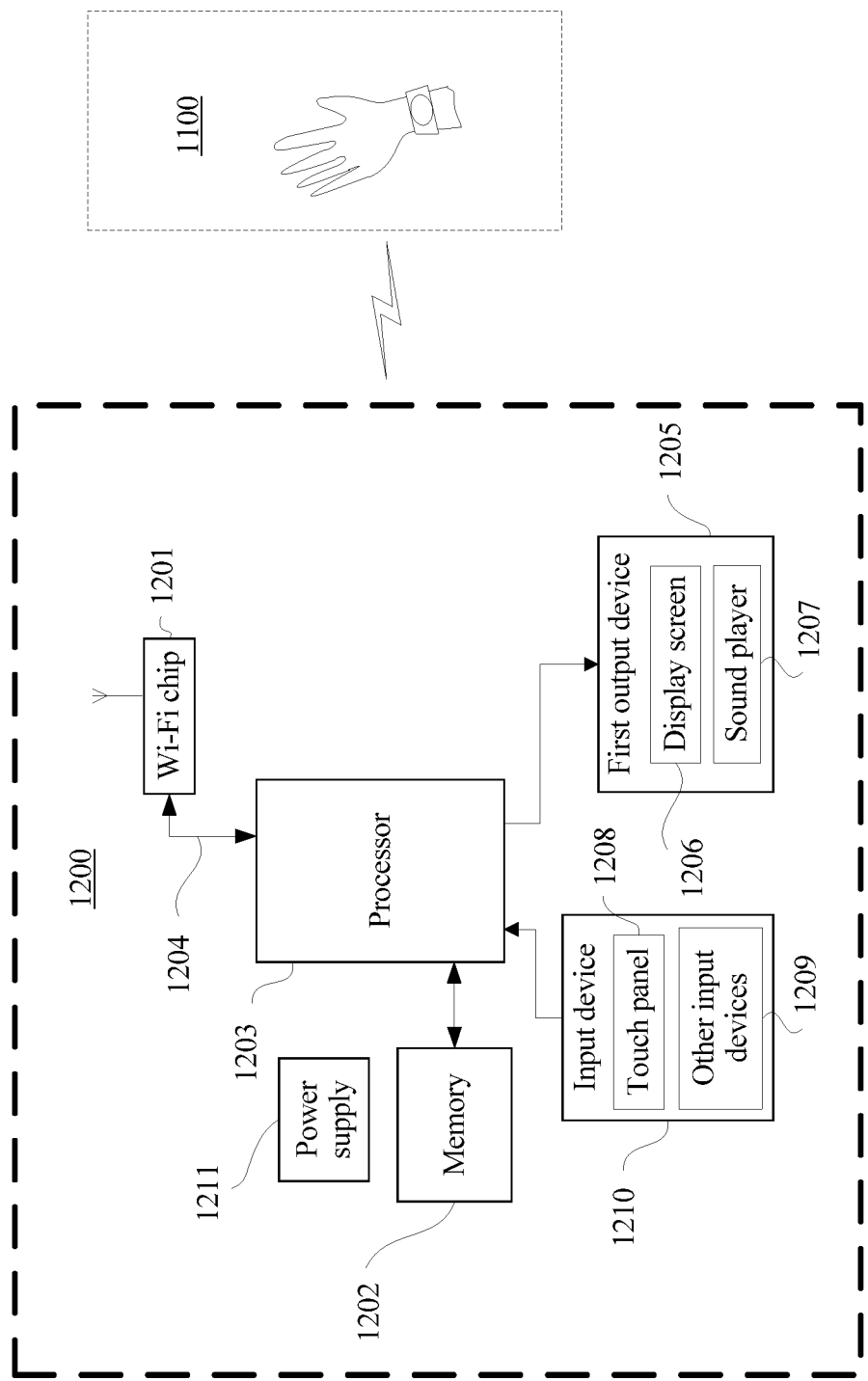
FIG. 12 is another schematic structural diagram of a first device according to an embodiment of this application.

FIG. 12 is a schematic structural diagram of the first device in FIG. 1. The first device 1200 may include the following structures or components: a Wi-Fi chip 1201, a memory 1202, a processor 1203, and a bus 1204. The Wi-Fi chip 1201 and the memory 1202 are separately connected to the processor 1203 by using the bus 1204.

The Wi-Fi chip 1201 is configured to provide a Wi-Fi connection. After the Wi-Fi connection to a Wi-Fi chip of another device is set up, Wi-Fi wireless data transmission can be implemented.

The Wi-Fi chip 1201 means a chip having a Wi-Fi communication function, and may be specifically an independent chip, or may be a chip integrated with other functions, for example, a joint chip integrating Wi-Fi, Bluetooth, FM, and GPS. The joint chip also has the Wi-Fi communication function.

The memory 1202 may store a software program and a software module. The processor 1203 runs the software program and the software module stored in the memory, so that the first device 1200 implements the following functions and processes data: enabling, by using the Wi-Fi chip 1201, a Wi-Fi access point; receiving a connection request of a second device; and sending feedback information to the second device according to the connection request, where the feedback information indicates whether the Wi-Fi access point is a portable Wi-Fi hotspot.

It can be learned that in this embodiment, a device providing a Wi-Fi access point feeds back, to a device applying for a Wi-Fi connection, information that can indicate whether the Wi-Fi access point is a portable Wi-Fi hotspot, so that the device applying for the Wi-Fi connection is reminded in time that the Wi-Fi access point to which the device is to connect is a portable Wi-Fi hotspot. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

The memory 1202 may mainly include a program storage area and a data storage area. The program storage area may store an operating system, an application program required by at least one function (for example, request receiving or information sending), and the like. The data storage area may store data and the like created based on use of the first device 1200. In addition, the memory 1202 may include a high-speed random access memory, or may include a non-volatile memory, for example, at least one magnetic disk storage device, a flash memory device, or another volatile solid-state storage device.

The processor 1203 is a control center of the first device 1200. The processor 1203 connects to all parts of the entire first device 1200 by using various interfaces and lines. By running or executing a software program and/or a software module stored in the memory 120 and by invoking data stored in the memory 1202, the processor 1203 performs various functions of the first device 1200 and processes data, to control the entire first device 1200 (including the Wi-Fi chip 1201). Optionally, the processor 1203 may include one or more processing units. Preferably, the processor 1203 may integrate an application processor and a modem processor. The application processor mainly processes an operating system, a user interface, an application program, and the like. The modem processor mainly processes wireless communication. It can be understood that the modem may alternatively not be integrated into the processor 1203.

In addition, the first device 1200 may further include: a first output device 1205, configured to: output, according to the indication of the processor 1203, first prompt information and/or information about a quantity of devices connected to the Wi-Fi access point.

The first output device 1205 may be a display screen 1206, a sound player 1207, or the like. The display screen may be configured to display the first prompt information and/or the information about the quantity of devices connected to the Wi-Fi access point, and may further receive user input. Specifically, the display manner shown in FIG. 2c to FIG. 2e may be used for displaying. Specifically, the display screen may include a display panel and a touch panel. The display panel may be configured in a form of an LCD (Liquid Crystal Display, liquid crystal display), an OLED (Organic Light-Emitting Diode, organic light-emitting diode), or the like. The touch panel may also be referred to as a touchscreen, a touch-sensitive screen, and the like. The touch panel may collect a touch or non-touch operation performed by a user on or near the touch panel (for example, an operation performed by the user on the touch panel or near the touch panel by using any appropriate object such as a finger or a stylus, or a motion sensing operation, including a single-point control operation, a multi-point control operation, or another type of operation), and drive a corresponding connected apparatus according to a preset program. Optionally, the touch panel may include two parts: a touch detection apparatus and a touch controller. The touch detection apparatus detects a touch location and a touch gesture of a user, detects a signal brought by a touch operation, and sends the signal to the touch controller. The touch controller receives touch information from the touch detection apparatus, converts the touch information into information that can be processed by the processor, and sends the information to the processor 1203; and can receive and execute a command sent by the processor 1203. In addition, the touch panel may be implemented in a plurality of types, for example, a resistive type, a capacitive type, an infrared ray type, and a surface acoustic wave type, or the touch panel may be implemented by using any technology developed in the future. Further, the touch panel may cover the display panel, and the user may perform, based on content displayed on the display panel (the displayed content includes but is not limited to a soft keyboard, a virtual mouse, a virtual key, an icon, and the like), an operation on or near the touch panel covering the display panel. After detecting the operation performed on or near the touch panel, the touch panel transfers the operation to the processor 1203 by using an input/output bus, to determine the user input. Then, the processor 1203 provides corresponding visual output on the display panel based on the user input by using the input/output bus.

Alternatively, the first device 1200 may be connected to the second output device 1100. The second output device 1100 is configured to output, according to the indication of the processor 1203, the first prompt information and/or the information about the quantity of devices connected to the Wi-Fi access point.

The second output device 1100 may be an output device on a wrist strap device associated with the first device 1200. For example, the first device 1200 is a mobile phone device, a smart band is associated with the mobile phone, and the second output device 1100 is the smart band. The smart band has a display screen, a sound player, and the like. For a composition and an implementation of the second output device 1100, refer to related content of the first output device 1205. Details are not described herein again.

It should be noted that the sound player may be implemented by using a structure such as an audio circuit and a speaker, and may be connected to the processor 1203 by using an audio interface. The audio circuit converts, into an analog signal, information that needs to be output by the processor 1203, and transmits the analog signal to the speaker, so that the speaker converts the analog signal into a sound signal for outputting.

In addition, the first device 1200 may further include an input device 1210 that has a touch panel 1208 and other input devices 1209, and a power supply 1211 that supplies power to all the components, and may further include a camera, a Bluetooth module, and the like. Details are not described herein.

For a specific implementation of functions of the structures in the first device 1200, refer to the foregoing corresponding content. Details are not described herein.

Figure 13:
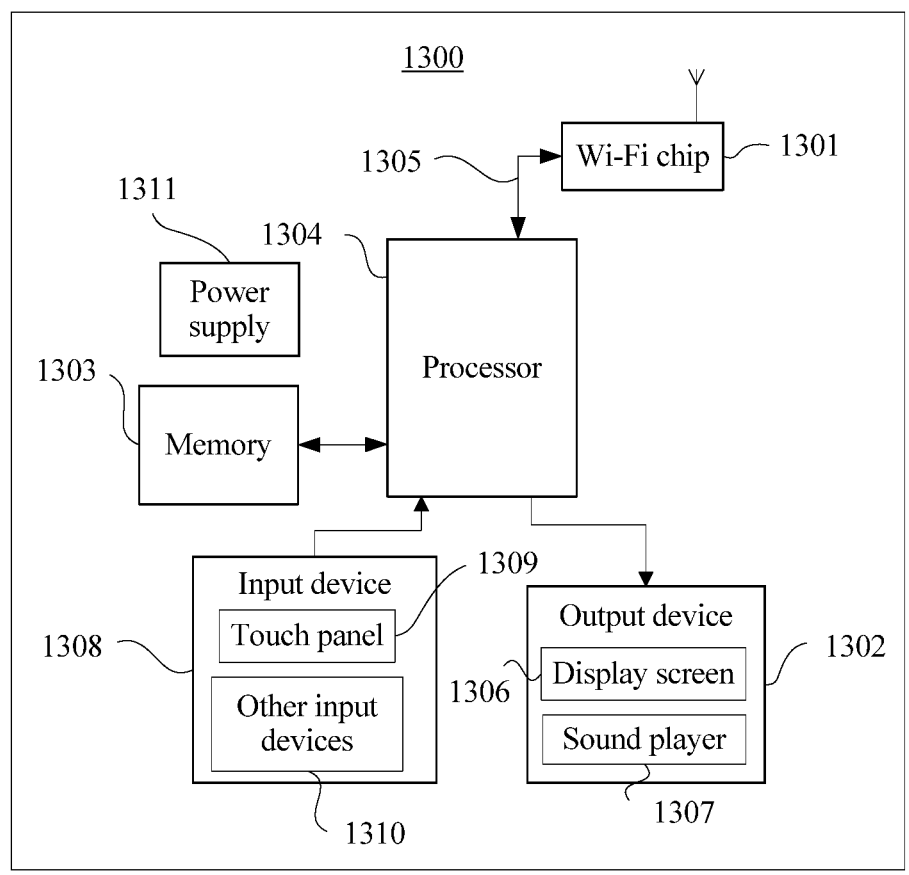
FIG. 13 is another schematic structural diagram of a second device according to an embodiment of this application.

FIG. 13 is a schematic structural diagram of the second device in FIG. 1. The second device 1300 may include the following structures or components: a Wi-Fi chip 1301, an output device 1302, a memory 1303, a processor 1304, and a bus 1305. The Wi-Fi chip 1301, the output device 1302, and the memory 1303 are separately connected to the processor 1304 by using the bus 1305.

The Wi-Fi chip 1301 is configured to provide a Wi-Fi connection. After the Wi-Fi connection to a Wi-Fi chip of another device is set up, Wi-Fi wireless data transmission can be implemented.

The Wi-Fi chip 1301 means a chip having a Wi-Fi communication function, and may be specifically an independent chip, or may be a chip integrated with other functions, for example, a joint chip integrating Wi-Fi, Bluetooth, FM, and GPS. The joint chip also has the Wi-Fi communication function.

The output device 1302 is configured to output data. The output device 1302 may be a display screen 1306, a sound player 1307, or the like. The display screen 1306 may be configured to display information, and may further receive user input. Specifically, the display screen 1306 may include a display panel and a touch panel. The display panel may be configured in a form of an LCD, an OLED, or the like. The touch panel may also be referred to as a touchscreen, a touch-sensitive screen, and the like. The touch panel may collect a touch or non-touch operation performed by a user on or near the touch panel (for example, an operation performed by the user on the touch panel or near the touch panel by using any appropriate object such as a finger or a stylus, or a motion sensing operation, including a single-point control operation, a multi-point control operation, or another type of operation), and drive a corresponding connected apparatus according to a preset program. Optionally, the touch panel may include two parts: a touch detection apparatus and a touch controller. The touch detection apparatus detects a touch location and a touch gesture of a user, detects a signal brought by a touch operation, and sends the signal to the touch controller. The touch controller receives touch information from the touch detection apparatus, converts the touch information into information that can be processed by the processor, and sends the information to the processor 1304; and can receive and execute a command sent by the processor 1304. In addition, the touch panel may be implemented in a plurality of types, for example, a resistive type, a capacitive type, an infrared ray type, and a surface acoustic wave type, or the touch panel may be implemented by using any technology developed in the future. Further, the touch panel may cover the display panel, and the user may perform, based on content displayed on the display panel (the displayed content includes but is not limited to a soft keyboard, a virtual mouse, a virtual key, an icon, and the like), an operation on or near the touch panel covering the display panel. After detecting the operation performed on or near the touch panel, the touch panel transfers the operation to the processor 1304 by using an input/output bus, to determine the user input. Then, the processor 1304 provides corresponding visual output on the display panel based on the user input by using the input/output bus.

The memory 1303 is configured to store a software program and a software module. The memory 1303 may mainly include a program storage area and a data storage area. The program storage area may store an operating system, an application program required by at least one function (for example, request receiving or information sending), and the like. The data storage area may store data and the like created based on use of the first device. In addition, the memory 1303 may include a high-speed random access memory, or may include a non-volatile memory, for example, at least one magnetic disk storage device, a flash memory device, or another volatile solid-state storage device.

The processor 1304 is configured to run the software program and the software module stored in the memory 1303, so that the second device performs the following functions and data processing: searching, by using the Wi-Fi chip 1301, an ambient environment of the second device for a Wi-Fi access point, to obtain a list of Wi-Fi access points to which the second device can choose to connect, where the list of Wi-Fi access points includes at least one Wi-Fi access point; determining a target access point in the list of Wi-Fi access points; sending a connection request to a device in which the target access point resides; receiving feedback information that is returned, according to the connection request, by the device in which the target access point resides, where the feedback information indicates whether the target access point is a portable Wi-Fi hotspot; and if the feedback information indicates that the target access point is a portable Wi-Fi hotspot, triggering the output device 1302 to output second prompt information, where the second prompt information is used to remind a user of the device that the target access point is a portable Wi-Fi hotspot.

The processor 1304 is a control center of the first device. The processor 1304 connects to all parts of the entire first device by using various interfaces and lines. By running or executing a software program and/or a software module stored in the memory 1303 and by invoking data stored in the memory 1303, the processor 1304 performs various functions of the first device and processes data, to control the entire first device (including the Wi-Fi chip 1301). Optionally, the processor 1304 may include one or more processing units. Preferably, the processor 1304 may integrate an application processor and a modem processor. The application processor mainly processes an operating system, a user interface, an application program, and the like. The modem processor mainly processes wireless communication. It can be understood that the modem may alternatively not be integrated into the processor 1304.

The Wi-Fi chip 1301 is further configured to: set up a Wi-Fi connection to the target access point according to the indication of the processor 1304; determine whether login information of the second device is consistent with a login parameter of the target access point; and if the login information of the second device is consistent with the login parameter of the target access point, connect to the target access point. In addition, the processor 1304 is further configured to: if the feedback information indicates that the target access point is a portable Wi-Fi hotspot, determine whether a default connection mode is used; and if the default connection mode is used, trigger the output device 1302 to output the second prompt information, and trigger the Wi-Fi chip 1301 to set up a Wi-Fi connection to the target access point.

In addition, the second device may further include: an input device 1308, connected to the processor 1304 by using the bus 1305, and configured to collect an input operation.

The input device 1308 may include a touch panel 1309 and other input devices 1310. Specifically, the input device 1308 may be configured to receive input digital or character information and generate key signal input related to a user setting and function control of the second device. Specifically, the input device 1308 may include but is not limited to one or more of a physical keyboard, a function button (such as a volume control button or an on/off button), a trackball, a mouse, a joystick, an optical mouse (the optical mouse is a touch-sensitive surface that does not display visual output, or an extension to a touch-sensitive surface formed by a touchscreen), or the like.

In this case, the processor 1304 is further configured to: if the default connection mode is not used, obtain an input operation of the user that is received by the input device 1306, and determine whether the input operation indicates that the user of the second device needs to connect to the target access point; and if the input operation indicates that the user of the second device needs to connect to the target access point, trigger the output device 1302 to output the second prompt information, and trigger the Wi-Fi chip 1301 to set up a Wi-Fi connection to the target access point.

In addition, the Wi-Fi chip 1301 is further configured to monitor whether a Wi-Fi access point whose login parameter is consistent with login information in the connection request is found. Correspondingly, according to the indication of the processor 1304, when the Wi-Fi chip 1301 finds the Wi-Fi access point whose login parameter is consistent with the login information, the output device 1302 may output third prompt information and trigger the input device 1308 to collect an input operation. In this way, when the input operation indicates that switching to the found Wi-Fi access point is required, according to the indication of the processor 1304, the Wi-Fi chip 1301 disconnects from the target access point, and sets up a Wi-Fi connection to the found Wi-Fi access point.

It can be learned that in this application, that connected Wi-Fi is a portable Wi-Fi hotspot can be identified in time by receiving feedback information sent by a device providing the Wi-Fi access point. Therefore, a device connecting to the Wi-Fi access point can learn in time that the Wi-Fi access point to which the device connects is a portable Wi-Fi hotspot. In this way, a great traffic loss is avoided as soon as possible for the device providing the Wi-Fi hotspot.

In addition, the second device may further include a power supply 1311 that supplies power to all the components, and may further include a camera, a Bluetooth module, and the like. Details are not described herein.

For a specific implementation of functions of the structures in the second device, refer to the foregoing corresponding content. Details are not described herein.

In addition, this embodiment further provides a computer readable storage medium. The computer readable storage medium stores an instruction. When the instruction is run on a computer, the computer performs the methods in the foregoing aspects. The computer readable storage medium in this application may be a magnetic disk, an optical disc, a data card, a USB flash drive, or various types of memories.

This embodiment further provides a computer program product that includes an instruction. When the computer program product is run on a computer, the computer performs the methods in the foregoing aspects.

All or some of the foregoing embodiments may be implemented by using software, hardware, firmware, or any combination thereof. When software is used to implement the embodiments, the embodiments may be implemented fully or partially in a form of a computer program product.

The computer program product includes one or more computing instructions. When the computing instruction is loaded and executed on the computer, the procedures or the functions according to the embodiments of the present invention are fully or partially generated. The computer may be a general-purpose computer, a dedicated computer, a computer network, or another programmable apparatus.

In addition, the computing instruction may be stored in a computer-readable storage medium or may be transmitted from a computer-readable storage medium to another readable storage medium. The computer-readable storage medium may be a magnetic disk, an optical disc, a data card, a USB flash drive, or various types of memories. For example, the computing instruction may be transmitted from a website, computer, server, or data center to another website, computer, server, or data center in a wired manner (for example, using a coaxial cable, an optical fiber, or a digital subscriber line) or a wireless manner (for example, using infrared, radio, microwave, or the like).

The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a digital video disc (Digital Video Disc, DVD)), a semiconductor medium (for example, a solid-state drive (Solid-State Drive, SSD)), or the like.

The embodiments in the specification are all described in a progressive manner. Each embodiment focuses on a difference from other embodiments. For same or similar parts in the embodiments, refer to these embodiments.

The invention claimed is:

1. A method, comprising:
   enabling, by a first device, a Wi-Fi access point of the first device;
   receiving, by the first device, a connection request of a second device to start a process of connecting to the Wi-Fi access point of the first device;
   sending, by the first device, feedback information to the second device according to the connection request, wherein the feedback information indicates whether the Wi-Fi access point of the first device is of a portable Wi-Fi hotspot type, and wherein the feedback information triggers:
   a prompt to be displayed on the second device indicating the first device is of the portable Wi-Fi hotspot type; and
   an option to continue the process of connecting to the Wi-Fi access point of the first device or to connect to a third device having a Wi-Fi access point; and
   outputting, by the first device, in real-time, information about a quantity of devices connected to the Wi-Fi access point of the first device with an option to disconnect one or more users.

2. The method according to claim 1, further comprising:
   outputting, by the first device, first prompt information according to the connection request.

3. The method according to claim 1, further comprising:
   determining, by the first device, whether login information in the connection request is consistent with a login parameter preset for the Wi-Fi access point of the first device; and
   when the login information is consistent with the login parameter, allowing the second device to connect to the Wi-Fi access point of the first device.

4. A method, comprising:
   searching, by a second device, an ambient environment of the second device for a Wi-Fi access point, to obtain a list of Wi-Fi access points to which the second device can attempt to connect, wherein the list of the Wi-Fi access points comprises a target access point;
   determining, by the second device, the target access point in the list of the Wi-Fi access points;
   sending, by the second device, a connection request to a first device in which the target access point resides to start a process of connecting a Wi-Fi access point of the first device, wherein the connection request causes the first device to output, in real-time, information about a quantity of devices connected to the Wi-Fi access point of the first device and an option to disconnect one or more users;
   receiving, by the second device, feedback information that is returned, according to the connection request, by the first device in which the target access point resides, wherein the feedback information indicates whether the target access point is of a portable Wi-Fi hotspot type; and
   when the feedback information indicates that the target access point is of the portable Wi-Fi hotspot type, outputting, by the second device, second prompt information, wherein the second prompt information informs a user of the second device that the target access point is of the portable Wi-Fi hotspot type and provides an option to continue the process of connecting to the Wi-Fi access point of the first device or to connect to a third device having a Wi-Fi access point.

5. The method according to claim 4, wherein after the outputting the second prompt information, the method further comprises:
   setting up, by the second device, based on a user selection to continue connecting to the Wi-Fi access point of the first device, a Wi-Fi connection to the target access point.

6. The method according to claim 5, wherein setting up the Wi-Fi connection to the target access point comprises:
   determining whether login information of the second device is consistent with a login parameter of the target access point; and
   when it is determined that the login information of the second device is consistent with the login parameter of the target access point, connecting to the target access point.

7. The method according to claim 4, further comprising:
   when the feedback information indicates that the target access point is of the portable Wi-Fi hotspot type, determining, by the second device, whether a default connection mode is used; and
   when it is determined that the default connection mode is used, outputting, by the second device, the second prompt information, and setting up a Wi-Fi connection to the target access point.

8. The method according to claim 7, further comprising:
   when it is determined that the default connection mode is not used, receiving, by the second device, an input operation of the user of the second device;
   determining, by the second device, whether the input operation indicates that the user of the second device instructs to connect to the target access point; and
   when the input operation indicates that the user of the second device instructs to connect to the target access point, outputting, by the second device, the second prompt information, and setting up the Wi-Fi connection to the target access point.

9. The method according to claim 8, wherein after setting up the Wi-Fi connection to the target access point, the method further comprises:
- monitoring whether a second Wi-Fi access point whose login parameter is consistent with login information in the connection request is found, and when the second Wi-Fi access point is found, outputting third prompt information; and
- collecting an input operation, and when the input operation indicates that switching to the second Wi-Fi access point is required, disconnecting from the target access point, and setting up the Wi-Fi connection to the second Wi-Fi access point.

10. A device, comprising:
- a Wi-Fi chip, configured to provide a Wi-Fi connection;
- an output device, configured to output data;
- a non-transitory memory, configured to store a software program;
- a processor; and
- a bus, wherein the Wi-Fi chip, the output device, and the non-transitory memory are separately connected to the processor using the bus, and
- wherein the non-transitory memory stores a program to be executed by the processor, the program including instructions for:
- searching, using the Wi-Fi chip, an ambient environment of the device for a Wi-Fi access point, to obtain a list of Wi-Fi access points to which the device can attempt to connect, wherein the list of the Wi-Fi access points comprises a target access point;
- determining the target access point in the list of the Wi-Fi access points;
- sending a connection request to a second device in which the target access point resides to start a process of connecting to the target access point, wherein the connection request causes the second device to output, in real-time, information about a quantity of devices connected to a Wi-Fi access point of the second device and an option to disconnect one or more users;
- receiving feedback information that is returned, according to the connection request, by the second device in which the target access point resides, wherein the feedback information indicates whether the target access point is of a portable Wi-Fi hotspot type; and
- when the feedback information indicates that the target access point is of the portable Wi-Fi hotspot type, triggering the output device to output second prompt information, wherein the second prompt information informs a user of the device that the target access point is of the portable Wi-Fi hotspot type and provides an option to continue the process of connecting to the target access point of the second device or to connect to a third device having a Wi-Fi access point.

11. The device according to claim 10, wherein the Wi-Fi chip is further configured to:
set up, based on a user selection to continue connecting to the Wi-Fi access point of the second device, a Wi-Fi connection to the target access point.

12. The device according to claim 11, wherein the Wi-Fi chip is configured to:
- determine whether login information of the device is consistent with a login parameter of the target access point; and
- when it is determined that the login information of the device is consistent with the login parameter of the target access point, connect to the target access point.

13. The device according to claim 10, wherein the program further includes instructions for:
- when the feedback information indicates that the target access point is of the portable Wi-Fi hotspot type, determine whether a default connection mode is used; and
- when it is determined that the default connection mode is used, trigger the output device to output the second prompt information, and trigger the Wi-Fi chip to set up a Wi-Fi connection to the target access point.

14. The device according to claim 13, further comprising:
- an input device, connected to the processor using the bus, wherein the input device is configured to collect an input operation; and
- wherein the program further includes instructions for:
  - when it is determined that the default connection mode is not used, obtain an input operation of the user of the device that is received by the input device, and determine whether the input operation indicates that the user of the device instructs to connect to the target access point; and
  - when the input operation indicates that the user of the device instructs to connect to the target access point, trigger the output device to output the second prompt information, and trigger the Wi-Fi chip to set up the Wi-Fi connection to the target access point.

15. The device according to claim 14, wherein the Wi-Fi chip is further configured to: monitor whether a second Wi-Fi access point whose login parameter is consistent with login information in the connection request is found; and
wherein the output device is further configured to:
- when the Wi-Fi chip finds the second Wi-Fi access point whose login parameter is consistent with the login information, output third prompt information, and trigger the input device to collect an input operation; and
- when the input operation indicates that switching to the second Wi-Fi access point is required, the Wi-Fi chip disconnects from the target access point, and sets up the Wi-Fi connection to the second Wi-Fi access point.

* * * * *